US012750303B2

(12) United States Patent
Eastlake, III

(10) Patent No.: US 12,750,303 B2
(45) Date of Patent: Sep. 29, 2026

(54) METHOD FOR NETWORK SUBGRAPH LINK SELECTION

(71) Applicant: Huawei Technologies Co., Ltd., Shenzhen (CN)

(72) Inventor: Donald Eggleston Eastlake, III, Apopka, FL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 18/162,482

(22) Filed: Jan. 31, 2023

(65) Prior Publication Data

US 2023/0269171 A1 Aug. 24, 2023

Related U.S. Application Data

(63) Continuation of application No. PCT/US2020/044557, filed on Jul. 31, 2020.

(51) Int. Cl.
*H04L 45/12* (2022.01)
*H04L 45/16* (2022.01)

(52) U.S. Cl.
CPC .......... *H04L 45/123* (2013.01); *H04L 45/124* (2013.01); *H04L 45/16* (2013.01)

(58) Field of Classification Search
None
See application file for complete search history.

(56) References Cited

U.S. PATENT DOCUMENTS 6,327,266 B1 * 12/2001 Midani .............. H04Q 11/0478 370/473
7,466,655 B1 * 12/2008 Zhao ..................... H04L 45/121 370/252

(Continued)

FOREIGN PATENT DOCUMENTS

EP 1587262 A2 * 10/2005 ........... H04L 45/125
EP 1752738 A1 * 2/2007 ......... G01C 21/3453

(Continued)

OTHER PUBLICATIONS

"Information Technology—Telecommunications and information exchange between systems—Intermediate System to Intermediate System intra-domain routeing information exchange protocol for use in conjunction with the protocol for providing the connectionless-mode network service (ISO8473)," International Standard, ISO/IEC 10589, Second Edition, Nov. 15, 2022, 19 pages.

(Continued)

*Primary Examiner* — Sandarva Khanal
(74) *Attorney, Agent, or Firm* — Conley Rose, P.C.

(57) ABSTRACT

A method and network device for selecting links of a network subgraph, where the method includes: obtaining link costs of links in a network; obtaining node costs of nodes connected by each of the links in the network, where the node costs comprise a first node cost of a first node and a second node cost of a second node selected from the nodes; selecting a weighting parameter based on the link costs, the node costs, or both; calculating link and node costs for each of the links, where the link and node costs are calculated based on the link costs, the node costs, the weighting parameter, or any combination thereof; and selecting a link having a lowest link and node cost among the links.

12 Claims, 11 Drawing Sheets

(56) References Cited

U.S. PATENT DOCUMENTS

| | | | | |
|---|---|---|---|---|
| 9,294,604 | B1 * | 3/2016 | Wagner | H04M 1/72427 |
| 2002/0107880 | A1 * | 8/2002 | Bacon | G06F 12/0261 |
| 2004/0205239 | A1 | 10/2004 | Doshi et al. | |
| 2006/0002291 | A1 * | 1/2006 | Alicherry | H04L 45/28<br>370/225 |
| 2009/0185508 | A1 * | 7/2009 | Duke | H04W 40/246<br>370/255 |
| 2010/0118871 | A1 * | 5/2010 | Liu | H04L 45/54<br>370/389 |
| 2010/0188971 | A1 | 7/2010 | Chiang | |
| 2013/0107761 | A1 * | 5/2013 | Das | H04W 4/38<br>370/255 |
| 2017/0026263 | A1 * | 1/2017 | Gell | H04L 67/1023 |
| 2018/0132159 | A1 * | 5/2018 | Strong | H04W 40/02 |
| 2020/0252327 | A1 * | 8/2020 | Zukerman | H04L 45/126 |
| 2020/0389404 | A1 * | 12/2020 | Wu | H04L 45/28 |
| 2020/0409670 | A1 * | 12/2020 | Narangodage | G06F 8/33 |

FOREIGN PATENT DOCUMENTS

| | | | | |
|---|---|---|---|---|
| EP | 3226604 | A1 * | 10/2017 | H04W 72/23 |
| KR | 20170051153 | A | 5/2017 | |
| WO | WO-0203613 | A2 * | 1/2002 | H04L 45/22 |
| WO | 2004111775 | A2 | 12/2004 | |
| WO | 2007016326 | A1 | 2/2007 | |
| WO | WO-2007143714 | A2 * | 12/2007 | H04M 7/1275 |
| WO | WO-2013006154 | A1 * | 1/2013 | H04L 45/745 |
| WO | WO-2014185768 | A1 * | 11/2014 | H04W 40/12 |
| WO | WO-2014198053 | A1 * | 12/2014 | H04L 45/245 |
| WO | WO-2022015492 | A1 * | 1/2022 | H04L 41/344 |

OTHER PUBLICATIONS

Moy, J., “OSPF version 2,” RFC 2328, Network Working Group, Apr. 1998, 244 pages.

Perlman, R., et al., “ROuting Bridges (RBridges): Base Protocol Specification,” RFC 6325, Internet Engineering Task Force (IETF), Jul. 2011, 99 pages.

Chen, H., et al., “Flooding Topology Computation Algorithm,” draft-cc-lsr-flooding-reduction-09, Network Working Group, Jun. 5, 2020, 11 pages.

Chen, S., et al., “An Algorithm for Computing Dynamic Flooding Topologies,” draft-chen-lsr-dynamic-flooding-algorithm-00, Internet Engineering Task Force, Mar. 3, 2020, 8 pages.

Li, T., Ed., et al., “Dynamic Flooding on Dense Graphs,” draft-ietf-lsr-dynamic-floosing-11, Internet Engineering Task Force, Jun. 7, 2022, 41 pages.

White, R., et al., “IS-IS Optimal Distributed Flooding for Dense Topologies,” draft-white-distoptflood-04, Network Working Group, Jul. 27, 2020, 11 pages.

* cited by examiner

300

| Node Number | $Link_{HBW}$ 100mbps cost= 200000 | $Link_{LBW}$ 40mbps cost= 500000 | k= 0.0 | k= 0.80 | k= 1.00 | k= 1.25 |
|---|---|---|---|---|---|---|
| 1 | 3 | 3 | 0.17 | 3,920.21 | 47,619.05 | 1,069,584.62 |
| 2 | 1 | 5 | 0.17 | 5,117.50 | 66,666.67 | 1,632,664.49 |
| 3 | 1 | 8 | 0.11 | 3,594.64 | 47,619.05 | 1,193,129.63 |
| 4 | 2 | 4 | 0.17 | 4,439.55 | 55,555.56 | 1,292,458.80 |
| 5 | 0 | 5 | 0.20 | 7,247.80 | 100,000.00 | 2,659,147.95 |
| 6 | 1 | 4 | 0.20 | 5,959.00 | 76,923.08 | 1,861,214.28 |
| 7, 8 | 0 | 3 | 0.33 | 12,079.66 | 166,666.67 | 4,431,913.25 |
| 9 | 0 | 10 | 0.10 | 3,623.90 | 50,000.00 | 1,329,573.97 |
| 10, 11 | 0 | 1 | 1.00 | 36,238.98 | 500,000.00 | 13,295,739.74 |
| 12, 13 | 0 | 2 | 0.50 | 18,119.49 | 250,000.00 | 6,647,869.87 |
| 14, 15 | 0 | 1 | 1.00 | 36,238.98 | 500,000.00 | 13,295,739.74 |
| 16 | 0 | 3 | 0.33 | 12,079.66 | 166,666.67 | 4,431,913.25 |
| 17 | 0 | 2 | 0.50 | 18,119.49 | 250,000.00 | 6,647,869.87 |
| 18, 19 | 0 | 1 | 1.00 | 36,238.98 | 500,000.00 | 13,295,739.74 |
| 20, 21 | 0 | 4 | 0.25 | 9,059.75 | 125,000.00 | 3,323,934.94 |
| 22, 23, 24, 25 | 0 | 2 | 0.50 | 18,119.49 | 250,000.00 | 6,647,869.87 |
| 26, 27, 28, 29 | 0 | 1 | 1.00 | 36,238.98 | 500,000.00 | 13,295,739.74 |
| 30 | 0 | 2 | 0.50 | 18,119.49 | 250,000.00 | 6,647,869.87 |

FIG. 3

METHOD FOR NETWORK SUBGRAPH LINK SELECTION

CROSS-REFERENCE TO RELATED APPLICATIONS

This application is a continuation of International Patent Application No. PCT/US2020/044557 filed on Jul. 31, 2020, and entitled "Method for Network Subgraph Link Selection," which is related to co-pending International Patent Application No. PCT/US2020/041825 filed on Jul. 13, 2020, and entitled "Parameterized Method for Network Subgraph Root Selection." The contents of the aforementioned applications are incorporated herein by reference.

TECHNICAL FIELD

The present disclosure is generally related to network topologies, and more particularly, to methods of selecting a link for a subgraph of a given network topology.

BACKGROUND

Packet switched computer networks comprise a plurality of nodes interconnected to one another via links. When user data traffic arrives at an edge node from source a user equipment (UE), such traffic is forwarded by that node and each subsequent node it encounters to zero or more directly connected nodes in the network. If the traffic reaches one or more subsequent edge nodes, it usually departs the network to a destination UE. Control data may also be transmitted between nodes in the network. In a process referred to as "flooding," control data may be forwarded to reach every node in the network.

SUMMARY

A first aspect relates to method of selecting links for a network subgraph. The method includes: obtaining link costs of links in a network; obtaining node costs of nodes connected by each of the links in the network, where the node costs comprise a first node cost of a first node and a second node cost of a second node selected from the nodes; selecting a weighting parameter based on the link costs, the node costs, or both; calculating link and node costs for each of the links, where the link and node costs are calculated based on the link costs, the node costs, the weighting parameter, or any combination thereof; and selecting a link having a lowest link and node cost among the links.

Optionally, in any of the preceding aspects, another implementation of the aspect provides that the links in the network are those connecting a node forming part of the network subgraph to one or more nodes not yet part of the network subgraph.

Optionally, in any of the preceding aspects, another implementation of the aspect provides that the weighting parameter is selected to give equal weight to the links costs and the node costs.

Optionally, in any of the preceding aspects, another implementation of the aspect provides that the weighting parameter is selected to give greater weight to the links costs than the node costs.

Optionally, in any of the preceding aspects, another implementation of the aspect provides that the weighting parameter is selected to give greater weight to the node costs than the links costs.

Optionally, in any of the preceding aspects, another implementation of the aspect provides that the method further includes calculating a link and node cost for a candidate link selected from the links based on the following equation:

$$\text{Link and Nodes Cost} = \frac{1}{\frac{1}{N1C} + \frac{2*k2}{LC} + \frac{1}{N2C}},$$

where N1C denotes the first node cost, where N2C denotes the second node cost, where LC denotes a link cost of the candidate link, and where k2 denotes the weighting parameter.

Optionally, in any of the preceding aspects, another implementation of the aspect provides that at least one of the links is a multi-point link that connects more than two nodes.

Optionally, in any of the preceding aspects, another implementation of the aspect provides that the method further includes calculating a link and node cost for the multi-point link based on the following equation:

$$\text{Link and Nodes Cost} = \frac{1}{\frac{n*k2}{LC} + \sum_{i=1}^{n} \frac{1}{NiC}},$$

where n denotes a quantity of nodes to which the multi-point link connects, where LC denotes a link cost of the multi-point link, where k2 denotes the weighting parameter, and where NiC denotes a node cost of the $i^{th}$ node.

Optionally, in any of the preceding aspects, another implementation of the aspect provides that the method further includes selecting the weighting parameter by setting the weighting parameter to a value greater than 1.

Optionally, in any of the preceding aspects, another implementation of the aspect provides, that the method further includes selecting the weighting parameter by setting the weighting parameter to a value between 0 and 1.

A second aspect relates to a network device for selecting links of a network subgraph. The network device includes a storage device and a processor coupled to the storage device. The processor is configured to execute instructions on the storage device such that when executed, cause the network device to: obtain link costs of links in a network; obtain node costs of nodes connected by each of the links in the network, where the node costs comprise a first node cost of a first node and a second node cost of a second node selected from the nodes; select a weighting parameter based on the link costs, the node costs, or both; calculate link and node costs for each of the links, where the link and node costs are calculated based on the link costs, the node costs, the weighting parameter, or any combination thereof; and select a link having a lowest link and node cost among the links.

Optionally, in any of the preceding aspects, another implementation of the aspect provides that the links in the network are those connecting a node forming part of the network subgraph to one or more nodes not yet part of the network subgraph.

Optionally, in any of the preceding aspects, another implementation of the aspect provides that the weighting parameter is selected to give equal weight to the links costs and the node costs.

Optionally, in any of the preceding aspects, another implementation of the aspect provides that the weighting parameter is selected to give greater weight to the links costs than the node costs.

Optionally, in any of the preceding aspects, another implementation of the aspect provides that the weighting parameter is selected to give greater weight to the node costs than the links costs.

Optionally, in any of the preceding aspects, another implementation of the aspect provides that calculating a link and node cost for a candidate link selected from the links is based on the following equation:

$$\text{Link and Nodes Cost} = \frac{1}{\frac{1}{N1C} + \frac{2*k2}{LC} + \frac{1}{N2C}},$$

where N1C denotes the first node cost, where N2C denotes the second node cost, where LC denotes a link cost of the candidate link, and where k2 denotes the weighting parameter.

Optionally, in any of the preceding aspects, another implementation of the aspect provides that at least one of the links is a multi-point link that connects more than two nodes.

Optionally, in any of the preceding aspects, another implementation of the aspect provides that the calculating a link and node cost for the multi-point link is based on the following equation:

$$\text{Link and Nodes Cost} = \frac{1}{\frac{n*k2}{LC} + \sum_{i=1}^{n} \frac{1}{NiC}},$$

where n denotes a quantity of nodes to which the multi-point link connects, where LC denotes a link cost of the multi-point link, where k2 denotes the weighting parameter, and where NiC denotes a node cost of the $i^{th}$ node.

Optionally, in any of the preceding aspects, another implementation of the aspect provides that the weighting parameter is selected by setting the weighting parameter to a value greater than 1.

Optionally, in any of the preceding aspects, another implementation of the aspect provides, that the method further the weighting parameter is selected by setting the weighting parameter to a value between 0 and 1.

A third aspect relates to a network device for link selection. The network device includes: means for obtaining link costs of links in a network; means for obtaining node costs of nodes connected by each of the links in the network, where the node costs comprise a first node cost of a first node and a second node cost of a second node selected from the nodes; means for selecting a weighting parameter based on the link costs, the node costs, or both; means for calculating link and node costs for each of the links, where the link and node costs are calculated based on the link costs, the node costs, the weighting parameter, or any combination thereof; and means for selecting a link having a lowest link and node cost among the links.

The disclosed techniques improve automatic construction of distribution trees, flooding graphs, network subgraphs, and the like. In one implementation, a network subgraph to-be-constructed according to disclosed techniques may better employ more connected and more powerful nodes by prioritizing links and/or nodes for selection, where a link to grow the subgraph is that having the smallest weighted harmonic mean of the link's cost and the desirability of nodes connected to that link as indicated by their node cost divided by twice the number of nodes connected by the link. In another implementation, the disclosed techniques may prioritize more capable and/or low-cost links for selection. In yet another implementation, the disclosed techniques may prioritize links based on the bandwidth of a given link and the bandwidth of one or more nodes to which that link connects. While the techniques disclosed herein might be impractical for humans to perform, one or more network components (e.g., nodes, routers, controllers, etc.) can be configured to perform such techniques without having to perform any sort of exponential or polynomial difficulty computation of a global metric over an entire network/subgraph/path.

For the purpose of clarity, any one of the foregoing implementation forms may be combined with any one or more of the other foregoing implementations to create a new embodiment within the scope of the present disclosure. These embodiments and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 is a chart depicting Node Costs calculated according to embodiments of the disclosure;

DETAILED DESCRIPTION

Figure 1A:
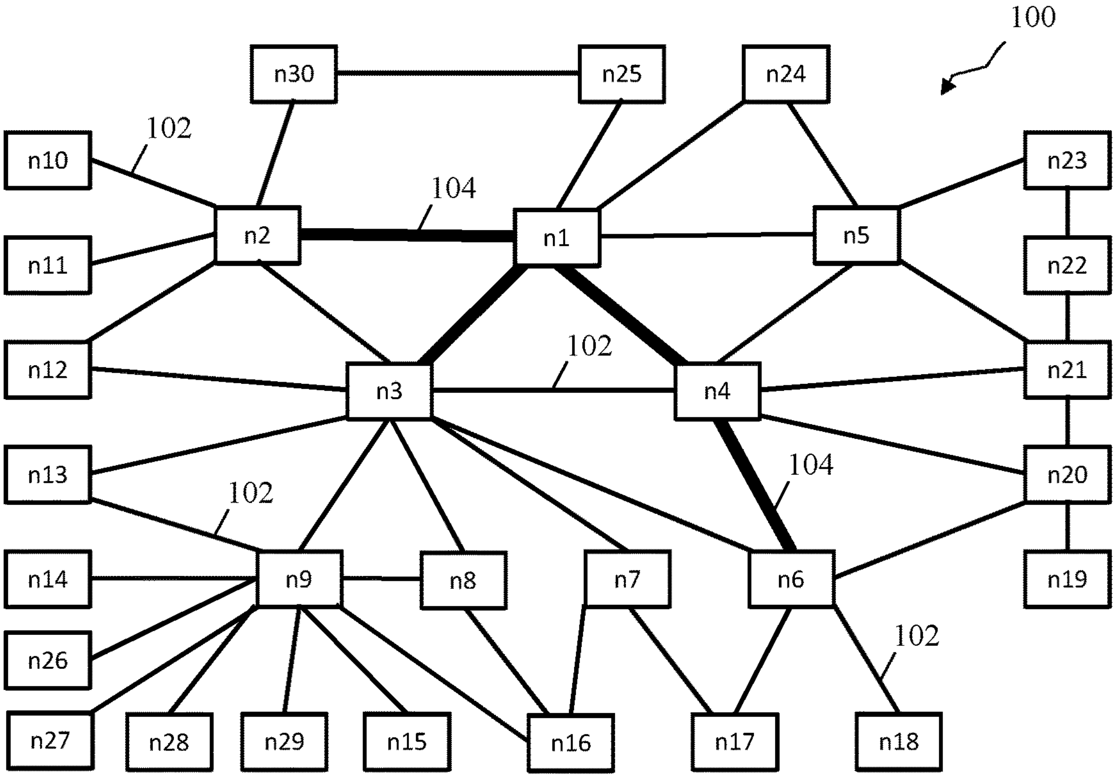
FIG. 1A is a schematic diagram of a network according to an embodiment of the disclosure.

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In some cases, a "tree" or "distribution tree" is used for transmission of user data and/or control data. A tree is a subgraph comprising an acyclic subset of the inter-node links that reaches every node in the network. Typical examples of such trees/graphs include a "spanning tree protocol" graph in bridged networks and multicast data distribution trees in the Transparent Interconnection of Lots of Links (TRILL) specification. Unless stated otherwise, "tree," "distribution tree," "subgraph," and "graph" are used herein interchangeably.

In other cases, a graph may be used for flooding control information. Such a graph differs from an acyclic tree in that it usually provides some redundancy of paths, and thus includes cycles. For example, the graph might be constructed such that each node is at least doubly connected, i.e., each node is attached to at least two links that are part of the flooding graph. Alternatively, the graph might be constructed so each node is triply or even more richly connected. Such more richly connected graphs can be constructed by first constructing an acyclic tree, and then adding selected links to achieve the desired richness of connectivity. However, there may be some nodes in the network that are only singly connected or otherwise have limited connectivity for which the desired richness of connectivity is unreachable.

A routing protocol specifies how routers communicate with each other, distributing information that enables them to select routes between any two nodes on a computer network. An interior gateway protocol (IGP) is a type of protocol used for exchanging routing information between gateways (commonly routers) within a network, which may be an autonomous system (AS). This routing information can then be used to route network-layer protocols like Internet Protocol (IP) packets.

Within IGP, there are different types of protocols such as a link-state routing protocols and distance vector protocols. A link-state routing protocol is performed by every switching node in the network (i.e., nodes that are prepared to forward packets; in the Internet, these are called routers). The basic concept of link-state routing is that every node constructs a map of the connectivity of the network, in the form of a graph, showing which nodes are connected to which other nodes. Each node then independently calculates the best, for example lowest cost, logical path or the best next hop interface from it to every possible destination in the network. Each collection of best paths will then form each node's routing table. Examples of link-state routing protocols include Open Shortest Path First (OSPF) routing protocol and Intermediate System to Intermediate System (IS-IS). OSPF is a standard routing protocol designated by the Internet Engineering Task Force (IETF).

OSPF uses Link State Advertisement (LSA) to exchange routing information between routers. IS-IS is a routing protocol standardized by the International Standards Organization (ISO). IS-IS uses Link State Protocol Data Unit (LSP) to exchange routing information between routers. For link-state routing protocols such as OSPF or IS-IS, control data is commonly flooded by each node sending such data on many and/or all links, with received duplicates of control data being discarded. This method of flooding control data can be wasteful in some cases. In a richly connected network, for example, a node will typically receive many copies (possibly even a hundred or more) of a link state update. As such, a flooding graph that reduces redundant transmission of control information may be used.

The construction or derivation of a distribution tree, flooding graph, or the like can be implemented in a variety of ways, for example by the following steps: (a) select a root node from which to grow the tree/graph (the root node may be designated as layer zero); (b) select and add links from that root node to directly connected nodes (these links and directly connected nodes may be designated as layer one); (c) if there are remaining nodes that are not part of the tree/graph, select links that are not yet part of the tree from layer one nodes to nodes that are not yet part of the tree (these added links and nodes may be designated as layer two); and (d) in each subsequent step, if there are remaining nodes that are not part of the tree, select links that are not yet part of the tree from the nodes of the layer added by the previous step to nodes that are not yet part of the tree (these added links and nodes may be designated as the next higher numbered layer, e.g., layer three, layer four, etc.). For some types of sub-graphs, such as link state flooding sub-graphs, there may be one or more additional stages in which additional links are added to the sub-graph. Another example method of construction would be to start by selecting a link, effectively making the set of nodes connected by that first link the tree "root", and then proceed as in steps (c) and (d) above. However, a tree or subgraph might be constructed in yet other ways after the selection of a root node or an initial link. For example, links could be added from remote nodes working towards the root node or initial link rather than from the root node or initial link outward. Alternatively, these techniques could be combined, or a tree could be built in other ways with an initial root node or link.

A tree may have multiple parallel physical links between a pair of nodes. When this situation is detected, (1) all but one of the links may be disabled for traffic; (2) the multiple links may be treated as a single link with traffic being split across the links; or (3) some combination of (1) and (2), e.g., with some of the parallel physical links being disabled while splitting traffic across those still enabled. In any case, all of these options may be treated as there being a single logical link between the nodes.

Links have a "cost" associated with them and the optimization of the path for data through a network is commonly thought of as minimizing the sum of the costs associated with the links over which that data passes. Most commonly the "cost" for a link is based on the reciprocal of the speed of that link. For example, the cost might be set to 20,000,000,000,000 (20 trillion) divided by the link speed in bits per second (bps). As another example, the cost could be based on reliability, monetary cost, delay, security, or any combination of these or other factors. Traditionally, the cost of a link is expressed as a positive integer. Costs are usually symmetric, meaning a link connecting nodes N1 and N2 would have the same cost from N1 to N2 as that from N2 to N1. However, there can be asymmetric costs where the cost from N1 to N2 is different from the cost from N2 to N1.

It is possible to use different definitions of link cost for different traffic. For example, traffic such as real-time gaming traffic might be very sensitive to delay, while bulk file transfers might be more sensitive to bandwidth or monetary cost. As such, different subgraphs may be constructed for such different traffic. For unicast routing applications, the goal is to minimize the cost of the path (sequence of links) over which data flows.

In a given tree, every node should have the same understanding of the tree's topology so that when receiving traffic on a link, the node can know what other links to send that data on. Constructing a subgraph of a network can be done in a distributed or centralized manner. For example, a distributed subgraph construction involves each node having sufficient information to compute how it fits into the subgraph. In contrast, a centralized subgraph construction involves one or more centralized controllers processing information to construct the subgraph and then sending that information to all of the nodes in the network.

FIG. 1A is a schematic diagram of a network 100 comprising a plurality of nodes n1, n2 . . . , n30 interconnected to one another via a plurality of links. In some embodiments, the links may be of varying bandwidths. In FIG. 1A, for example, the links include low bandwidth links 102 and high bandwidth links 104, the latter of which are denoted by thicker and bolder lines. Although 4 high bandwidth links 104 (i.e., n1-n2, n1-n3, n1-n4, and n4-n6) are depicted in this example, the network 100 may include more or less high bandwidth links in other examples.

Every node n1, n2 . . . , and n30 in the network 100 should have the same understanding of the network's topology so that when receiving traffic on a link, the node can know what other links to send that data on. To this end, a subgraph of the network 100 may be constructed. Constructing a subgraph may take place in a distributed or centralized manner. For example, a distributed subgraph construction involves configuring every node n1, n2 . . . , and n30 with sufficient information to compute how it fits into the subgraph. In contrast, a centralized subgraph construction involves one or more centralized controllers processing information of the constructed subgraph and then sending that information to all nodes n1, n2 . . . , and n30 in the network 100.

Regardless of the manner chosen, constructing a subgraph for the network 100 may begin with selecting a root node (e.g., n1, n2 . . . , or n30) from which the subgraph is to be constructed. One common selection method according to other approaches involves manually configuring a priority for a node to be selected as the root node. Alternatively, the root node may be automatically selected based on an identifier such as a serial number, an interface address (e.g., a medium access control (MAC) or Internet Protocol (IP) address of each node's port), an "order" or "degree" of a node (i.e., the number of other nodes to which it is directly connected by a link), or the like.

For example, a node having the lowest port MAC address or a node having the highest order node may be automatically selected as the root node where the "order" of a node is the number of links connected to that node. In some cases, a tiebreaking procedure may be implemented when the manual or automatic selection of an initial root node or link results in multiple candidates with the same score or cost (e.g., if two or more nodes may have the same priority or order). In such cases, the tiebreaking procedure may be based on an arbitrary unique number associated with a node (e.g., built-in device serial number, the lowest or highest address of one of the node ports, or the like).

Using an example according to other approaches, assume that the highest numbered node is automatically selected as the root node for constructing a subgraph of the network 100. Further assume the following: at each subsequent stage, the edge nodes of layer N are examined starting from the highest numbered layer N node to the lowest numbered layer N node; for each node examined, a link is added to each node to which it has a direct link if that node is not yet part of the subgraph in order to construct layer N+1 of the tree; and this same process is repeated for the next highest numbered layer until all nodes n1, n2 . . . , and n30 are part of the subgraph. A process of constructing a subgraph based on the foregoing example is further described with respect to FIGS. 1B-1H.

Figure 1B:
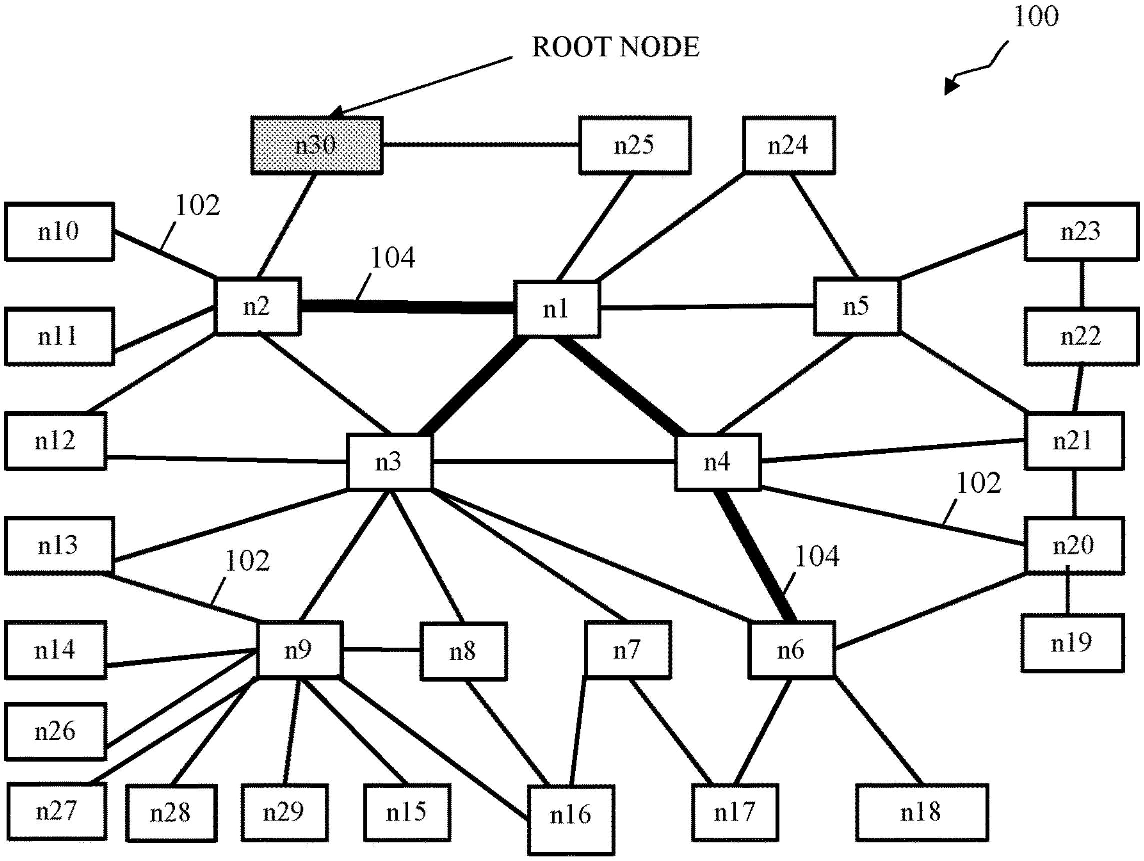
FIGS. 1B-1H depict different stages of a subgraph constructed for the network in FIG. 1A.
Figure 1C:
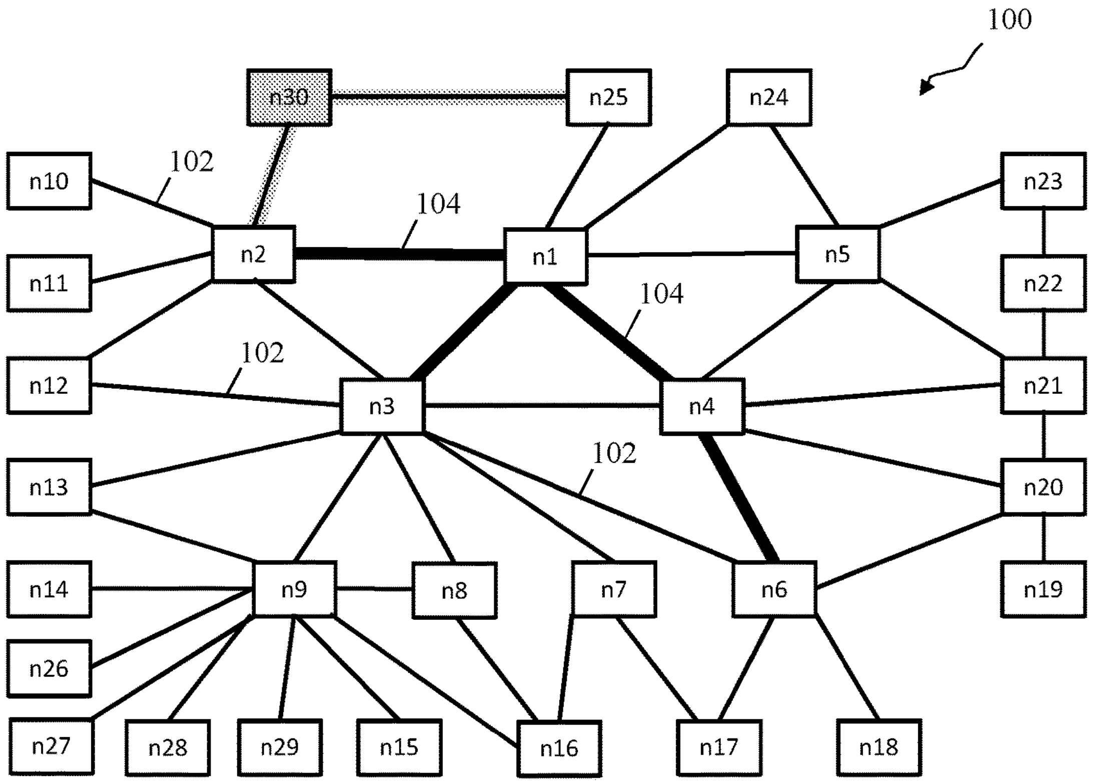

As shown in FIG. 1B, the process begins with automatically selecting node n30 as the root node because n30 is the highest numbered node in the network 100. The selection of root node n30 completes stage zero of constructing the subgraph. Note that each node to which the root node is connected in the following first stage may refer to a "layer one node." Similarly, each node to which a layer one node is connected in the second stage may refer to a "layer two node," each node to which a layer two node is connected in the third stage may refer to a "layer three node," and so forth.

The first stage of constructing the subgraph involves connecting the root node n30 to one or more other nodes in the network 100 that are not yet part of the subgraph. In this example, the root node n30 has two available connections. Thus, the root node n30 may be connected to 2 layer one nodes by adding one link from n30 to n25 and another link from n30 to n2 (the added links are shown via highlighted lines in FIG. 1C). The addition of these two links completes the first stage.

Figure 1D:
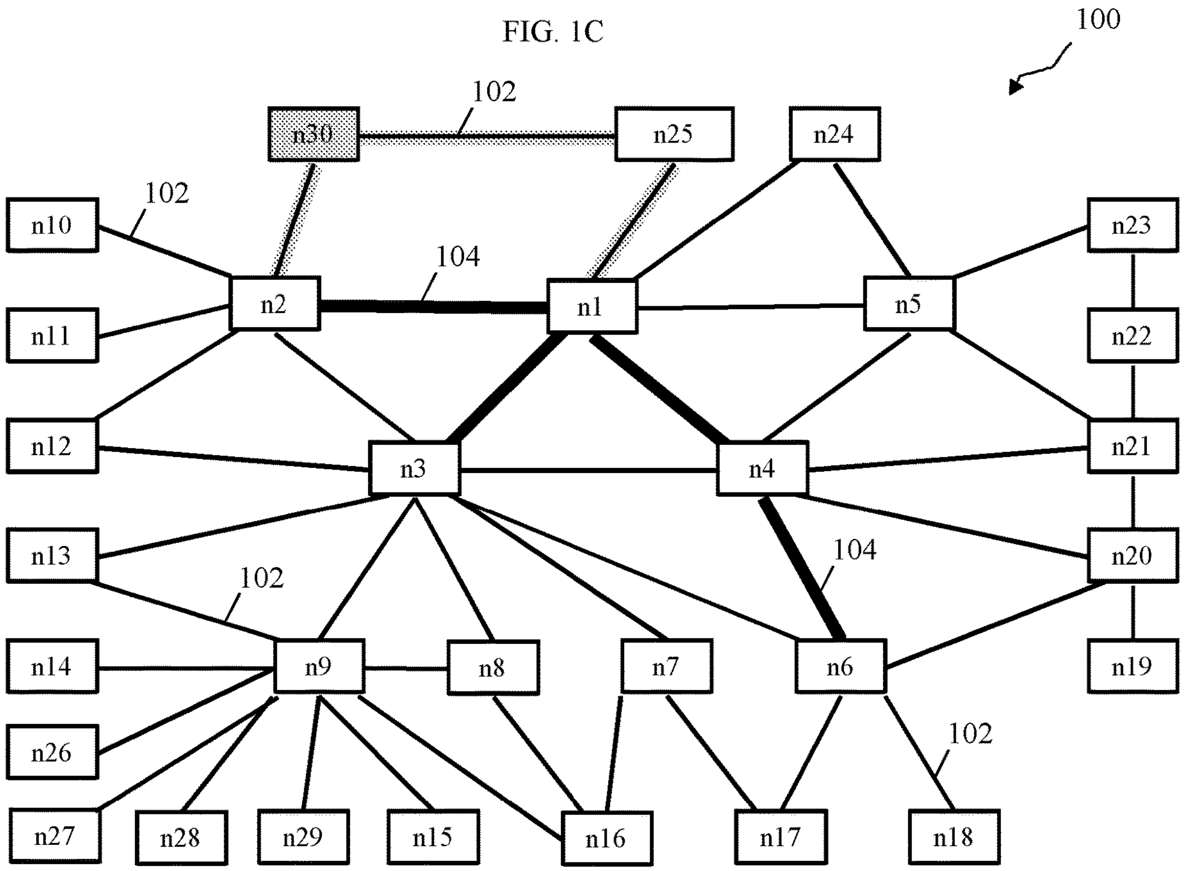
Figure 1E:
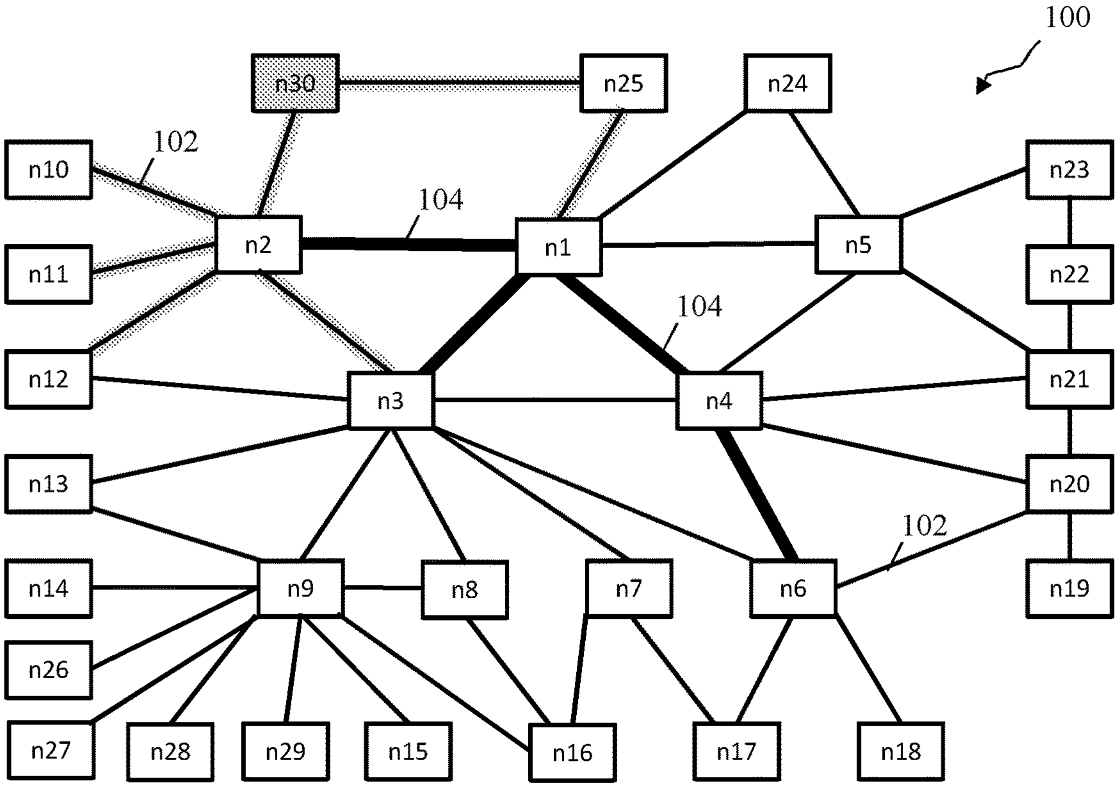

The second stage involves connecting layer one nodes n25 and n2 to one or more layer two nodes. As shown in FIG. 1D, this stage begins with adding a link from n25 to a layer two node n1 before adding any links from n2 because n25 is a higher numbered node than n2. Since no other connection links are available for n25, the second stage ends with adding 4 links from n2 to layer two nodes n10, n11, n12, and n3, such as shown in FIG. 1E. Note that although a link from n2 to n1 is available, this link is not added because n1 has already been connected via the link from n25. Further, adding a link from n2 to n1 would result in a loop (i.e., between n30, n25, n1, and n2), which can adversely impact data transmissions within the network 100 (e.g., when sending broadcast traffic or multicast data).

Figure 1F:
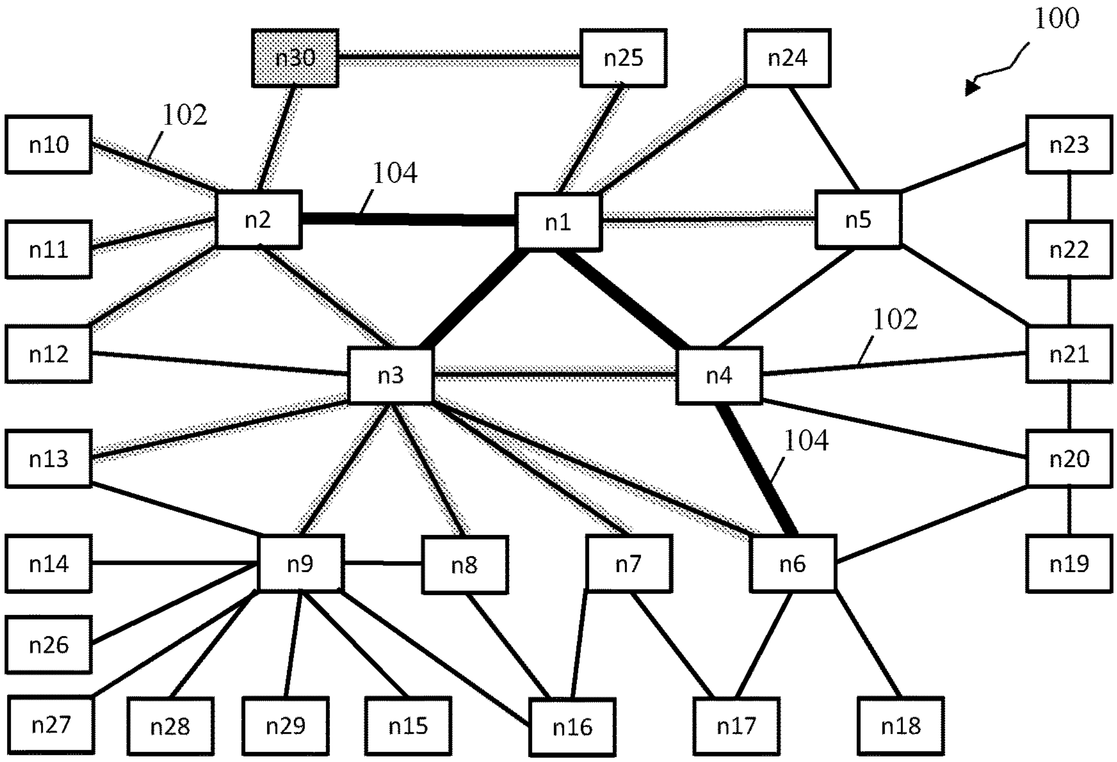

The third stage includes adding links from the layer two nodes (i.e., n1, n10, n11, n12, and n3) to one or more nodes that are not yet part of the subgraph. Note that no additional links are available from layer two nodes n10 and n11. While a link is available for connecting n12 to n3, this link is not added to the subgraph because n3 is already connected to n2. Thus, the third stage may ignore layer two nodes n10, n11, and n12 and proceed with adding links from n1 and n3, beginning with the latter since n3 is a higher numbered node. As shown in FIG. 1F, the third stage is complete after adding 6 links from n3 to layer three nodes n13, n9, n8, n7, n6, and n4, and then adding 2 links from n1 to layer three nodes n24 and n5.

Figure 1G:
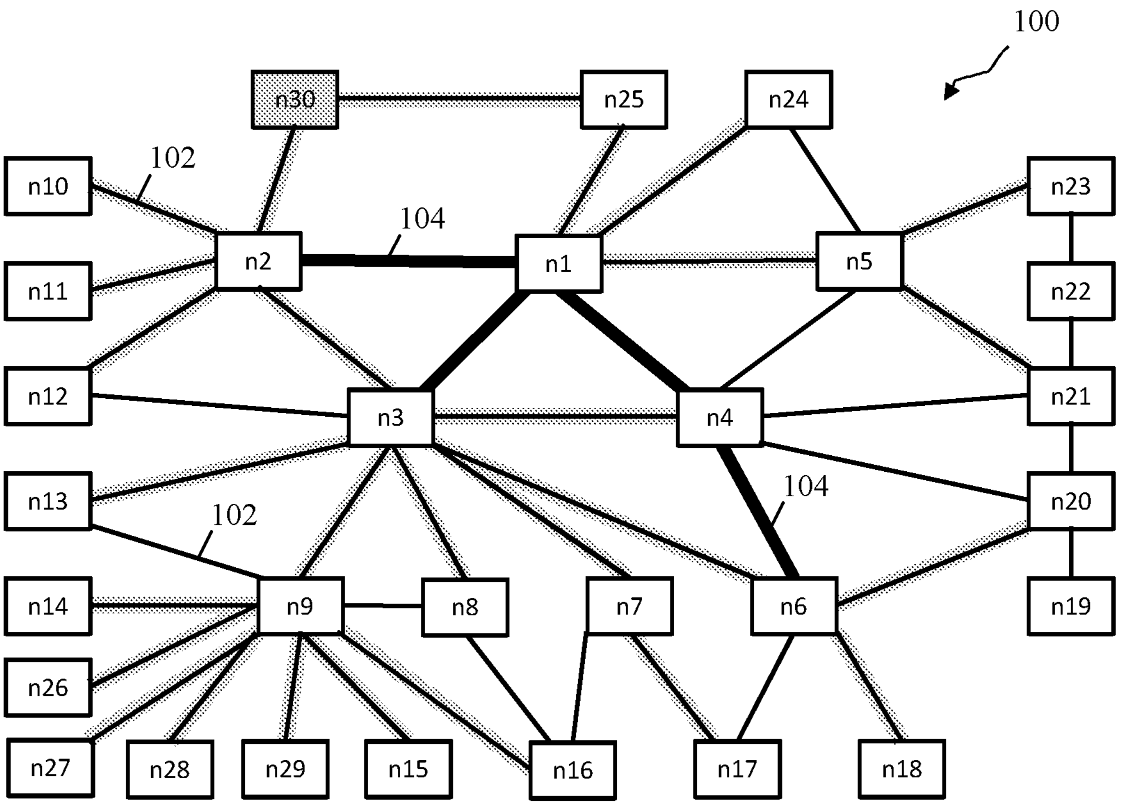

The fourth stage commences with the highest numbered layer three node n24, which has one available connection to n5. However, a link is not added from n24 to n5 because n5 has already been connected to n1. The second highest numbered layer three node is n13, but a link from n13 to n9 is not added for similar reasons. The third highest numbered layer three node is n9, which has 8 available connections. Thus, the fourth stage begins with adding 7 links from n9 to layer four nodes n14, n26, n27, n28, n29, n15, and n16, but without adding an eighth link from n9 to n8 because n8 has already been connected to n3. The next highest numbered layer three node is n8, but a link is not added from n8 to n16 because n16 has already been connected to n9. The next highest numbered layer three node is n7, which has two available connections. Here, a link is added from n7 to layer four node n17, but not to n16. Next, 2 links are added from n6 to layer four nodes n18 and n20, but not to n17. As shown in FIG. 1G, the fourth stage is complete after adding 2 links from n5 to layer four nodes n23 and 21.

Figure 1H:
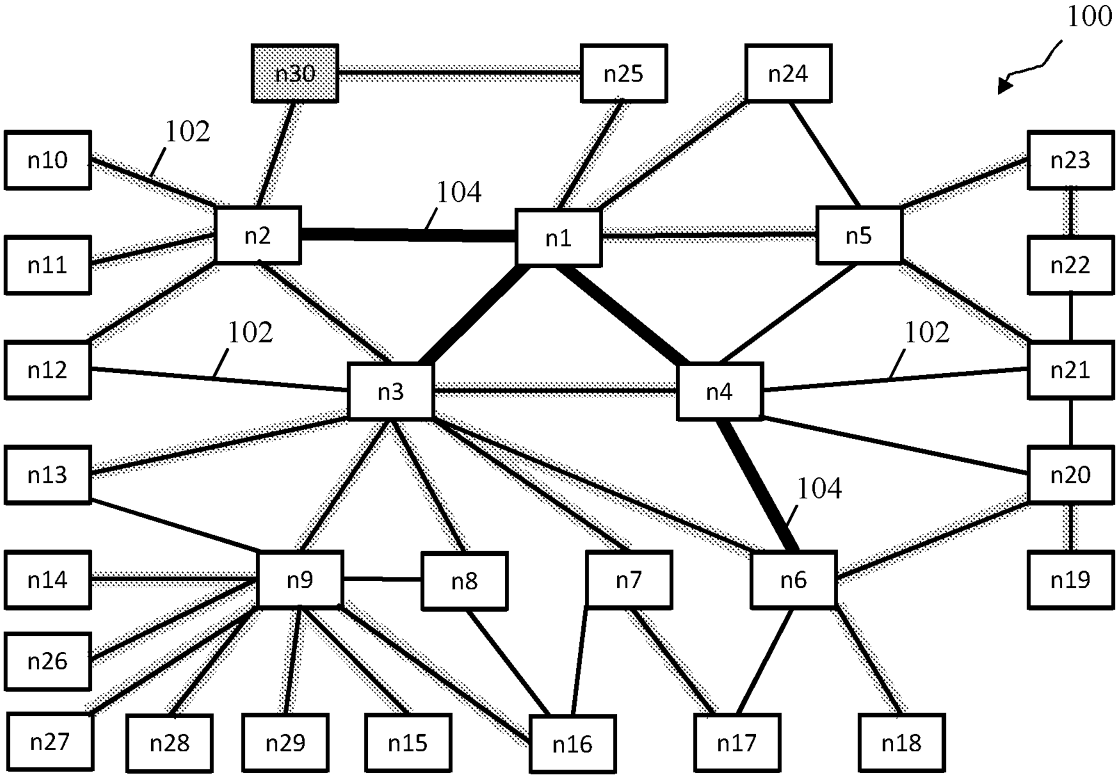

The fifth stage begins with adding a link from n23 to layer five node n22, and ends with adding a link from n20 to layer five node n19, thereby completing the subgraph. As shown in FIG. 1H, the constructed subgraph represents a complete acyclic tree spanning all nodes n1, n2 . . . , and n30 in the network 100. Although the final results depend on the characteristics of the network 100, it can be seen that constructing a subgraph according to other approaches (e.g., using the highest numbered node as a root node) can be less than optimal.

For example, the subgraph depicted in FIG. 1H does not use any of the high bandwidth links 104 (i.e., n2-n1, n1-n3, n1-n4, or n4-n6) in the network 100. Additionally, all traffic between the upper right area of the network 100 and the lower and left areas of the network 100 must pass through root node n30 and multiple lower bandwidth links 102 in the far upper left corner of the network 100. Further, the path between some edge nodes can include as many as 9 hops (e.g., path between edge nodes n22 and n14).

In the example above, the process of constructing a tree/graph involves selecting a root node and connecting the root node to other nodes in the network via one or more links. In one approach, this process may be based on a serial number or a unique identifier of the node to be connected. Another approach may be selecting a link having a least cost path to the root node from a node not yet connected to the subgraph being constructed, where the link connects to another node that is already part of the subgraph. However, this approach does not consider the capabilities of different nodes at the ends of a link.

Different applications may favor different types of links and/or nodes. For example, high bandwidth user traffic with many sources and sinks favors subgraphs including high bandwidth links and thus the nodes connected to such links. Heuristically, nodes with higher bandwidth links are also more capable and have lower latency than nodes with links of lower bandwidth. As such, nodes with higher bandwidth links tend to have more powerful hardware (e.g., to handle short inter-packet arrival times) and are likely more efficient in moving traffic from port to port. On the other hand, flooding graphs for lower bandwidth control traffic (e.g., link state information) favor nodes with many links in order to more rapidly disseminate control information to many other nodes. Thus, a subgraph having better connected and more powerful nodes may depend on the presence of low-cost links and the number of links connected to each node.

Disclosed herein is an improved method of automatically constructing distribution trees, flooding graphs, subgraphs, and the like, by prioritizing links and/or nodes for selection. In an embodiment, the method prioritizes more capable links and/or low-cost links by calculating a "Link Cost" for each link among a set of candidate links. In another embodiment, the method prioritizes more capable links as well as more capable nodes by also utilizing "Node Costs," and thus combining the capabilities of the node(s) at the end(s) of a link with the "Link Cost." For example, this method may employ a "Link and Nodes Cost" computation with parameterized weighting based on the weighted harmonic mean of a link's cost and the cost of nodes to which the link connects divided by twice the number of nodes the link connects. In yet another embodiment, the method selects links by calculating "Link and Nodes Bandwidth," which is a combination of a link's bandwidth and the bandwidth of nodes attached to that link. The methods disclosed herein may be implemented without computing a global metric over an entire network/subgraph, the computation of which might require computation that is exponential or polynomial in the number of nodes or total number of links or typical path length in the network. Further, the disclosed methods are applicable to routing applications, link-state flooding graphs, multicast/broadcast distribution trees, and related standards. These and other features are detailed below.

Figure 2:
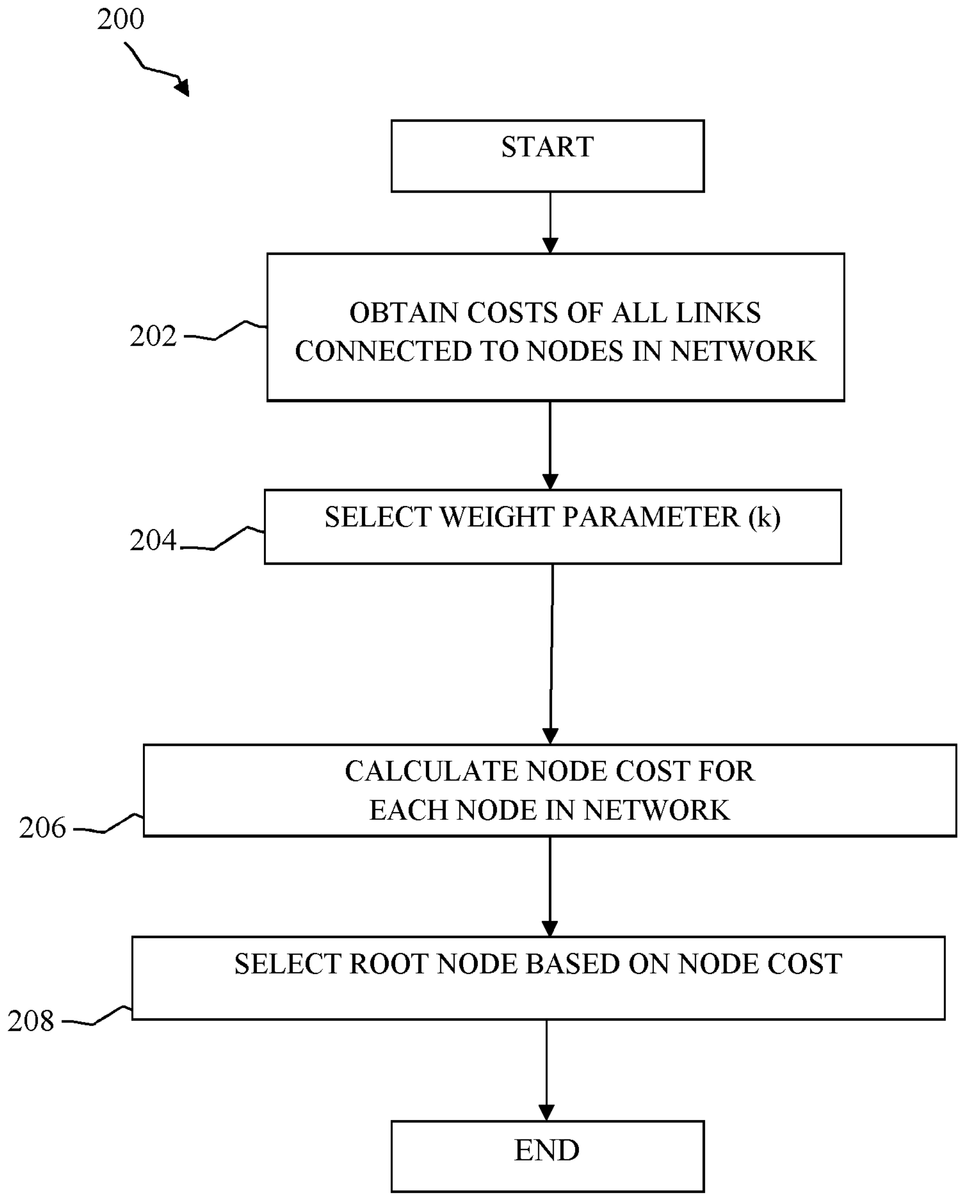
FIG. 2 is a flow chart of selecting a root node for a to-be-constructed subgraph of the network in FIG. 1A.

FIG. 2 illustrates a method 200 of selecting a root node for constructing an improved subgraph using better connected and more powerful nodes as a root node in a network such as the network 100 in FIG. 1A. The operations in the method 200 may be performed in the order shown, or in a different order. Further, two or more the operations of the method 200 may be performed concurrently instead of sequentially. In some implementations, the method 200 may be employed using a distributed tree calculation where every node (e.g., n1, n2 . . . , and n30) selects the same root node and computes the same subgraph of a network. In other implementations, the method 200 may be employed via one or more centralized controllers (e.g., a software-defined networking (SDN) controller) configured to select the root node, compute the subgraph, and provision all relevant network information to every node in the network.

At block 202, the method 200 obtains costs of all links connected to nodes in a network, where it may be assumed that each node has one or more links to other nodes in the network. Using the network 100 in FIG. 1A, for example, a cost C of each link for a particular node may be denoted as C1, C2, . . . , Cm, where m is the quantity of links connected to that node. Thus, in FIG. 1A, the costs of links connected to node n7 may be denoted as C1, C2, Cm, where Cm refers to C7 since node n7 is connected to three links. In some embodiments, link costs may be based on bandwidth, where a cost C of a particular low or high bandwidth link may be set to a value divided by link speed, e.g., $C=2*10^{13}$/bps. In other implementations, link costs may be based on one or more factors such as bandwidth, reliability, delay/latency, monetary cost per bit, security, or some combination thereof.

At block 204, the method 200 selects a weighting parameter k to be used at block 206. Additional details regarding the selection of weighting parameter k are discussed below with respect to Table 1. At block 206, the method 200 calculates a "Node Cost" for each node n1, n2, . . . , and n30 in the network. In an embodiment, the Node Cost may be set to a quotient produced by dividing the number of links connected to a particular node (e.g., n1, n2, . . . , or n30) into the harmonic mean of the $k^{th}$ power of the costs of the links connected to the node. For example, the node cost may be derived mathematically via the formula below:

$$\text{Node Cost} = \frac{HarmonicMean(C1^k, C2^k, C3^k, \ldots)}{NumberOfLinks}. \quad \text{(Equation 1)}$$

The formula above may be rewritten using either of the formulas below, but each formula is otherwise the same as that above. Thus, unless stated otherwise, these three formulas are collectively referred to as Equation 1.

$$\text{Node Cost} = \frac{1}{\frac{1}{C1^k} + \frac{1}{C2^k} + \frac{1}{C3^k} + \ldots},$$

$$\text{or Node Cost} = \frac{1}{C1^{-k} + C2^{-k} + C3^{-k} + \ldots}$$

Note that that Equation 1 assumes that the link costs C are greater than zero. If the type of link costs being used permits a value of zero or a negative value, a constant may be added to assure positive costs. As an example using non-negative integer costs, assume a link cost is equal to zero, in which case link costs may be incremented by 1 before using Equation 1 to compute the Node Cost.

At block 208, the method 200 selects a root node based on the node costs calculated in block 206, and the node having the lowest node cost is selected as the root node.

Table 1 below includes a mapping between values of k and the effects of selecting different values of k.

TABLE 1

| Value of k | Effect |
|---|---|
| k = 0 | The node cost is set to the order of the node, i.e., the number of links connected to the node. |
| 0 < k < 1 | Cost is based on the number of links and on the low cost of links connected to the node but, as k decreases, the number of links is given greater weight and the cost of links less weight. |
| k = 1 | The number of links connected to the node and the low cost of links are given equal weight. In an implementation where cost is based on a reciprocal of the link bandwidth, the node cost calculated with k = 1 will order nodes by a reciprocal of the total bandwidth of the links connected to a node. |
| 1 < k | Cost is based on the number of links and on the low cost of links connected to the node but, as k increases, the number of links is given less weight and the cost of links greater weight. |

As can be seen from Table 1, setting k equal to zero has the effect of setting the node cost for a particular node equal to the reciprocal of the number of links connected to that node, while setting k equal to 1 has the effect of giving equal weight to the number of nodes connected to that particular node and the presence of low cost links. Generally speaking, this latter option may be a reasonable choice when little to no information is known about a to-be-constructed subgraph. Otherwise, setting k to a value greater or lesser than 1 may be more reasonable depending on the intended use.

For example, when constructing a general multicast traffic distribution tree or a spanning tree that carries a volume of unicast and multicast traffic, traffic to/from the various branch ends of the tree will tend to be concentrated in the middle of the tree. Thus, k may be set to a value greater than 1 in this case, as the cost of central links in the tree will affect most user traffic, so more weight should be given to the presence of low cost links. On the other hand, in applications with limited control traffic being flooded to nodes, having richer connectivity may be of higher priority (e.g., to get control information to more nodes faster). As such, k may be set to a value less than 1 such that more weight is given to selecting a root node having more links attached to the root node.

FIG. 3 depicts a chart 300 of Node Costs calculated for the nodes n1, n2 . . . , n30 in the network 100 of FIG. 1A. The node costs were calculated based on an example where the high bandwidth links (i.e., n2-n1, n1-n3, n1-n4, and n4-n6) support speeds up to 100 megabits per seconds (mbps), while the other low bandwidth links support speeds up to 40 mbps. As shown in the chart 300, the link cost of a high bandwidth link ($Link_{HBW}$) is set to 200,000, while the link cost for a low bandwidth link ($Link_{LBW}$) is set to 500,000. It should be understood that the high bandwidth link and/or the low bandwidth link have other costs in other implementations. To demonstrate the effect of selecting weight parameter k at block 204 of the method 200, the node costs were calculated using different values of k as inputs to the formula disclosed above. It should be understood that other values of k may be used as input in other implementations.

The first column of the chart 300 specifies the node number corresponding to the nodes n1, n2 . . . , n30, where Node Number 1 corresponds to n1, Node Number 2 corresponds to n2, and so forth. The second and third columns specify the number of high bandwidth and low bandwidth links attached to each node. For example, the chart 300 specifies that node n1 is attached to three high bandwidth links (n1-n2, n1-n3, and n1-n4) and three low bandwidth links (n1-n25, n1-n24, and n1-n5), as depicted in FIG. 1A. The fourth, fifth, sixth, and seventh columns specify the Node Costs calculated using different values of k as inputs to Equation 1.

As previously mentioned, the method 200 may select a node having the lowest Node Cost as a root node. Thus, when k is set equal to 0.0, node n9 may be selected as the root node because the corresponding Node Cost is 0.10, which is the lowest Node Cost calculated using Equation 1. Note that node n9 has more links (10) attached to it than any other node. Thus, the Node Cost for node n9 is consistent with Table 1 for k=0, which indicates that the Node Cost is set to the reciprocal of the number of links connected to that node. The node having the second most links connected to it is node n3, which has a total of 9 links connected to it. Therefore, node n3 has the second lowest Node Cost (0.11) when k is set to 0.0 as an input to Equation 1 for node n3. By comparison, nodes having only 1 connecting link (e.g., n10 and n14) have a Node Cost equal to 1.0, which is tenfold higher than the lowest Node Cost of node n9.

When k is set to 1.0 as an input to Equation 1, there are two nodes (n1 and n3) that may be selected as a root node because these nodes both have the lowest Node Cost (47, 619.05). In this case, a tiebreaking procedure may be implemented to select between nodes n1 and n3 as the root node. For example, node n1 may be selected as the root node because n1 is a lower numbered node than n3. Alternatively, node n3 may be selected as the root node because n3 is a higher numbered node than n1. As another example, node n3 may be selected as the root node because n3 is connected to more links than n1. As yet another example, node n1 may be selected as the root node if the number of high bandwidth links is an important criterion.

Figure 4:
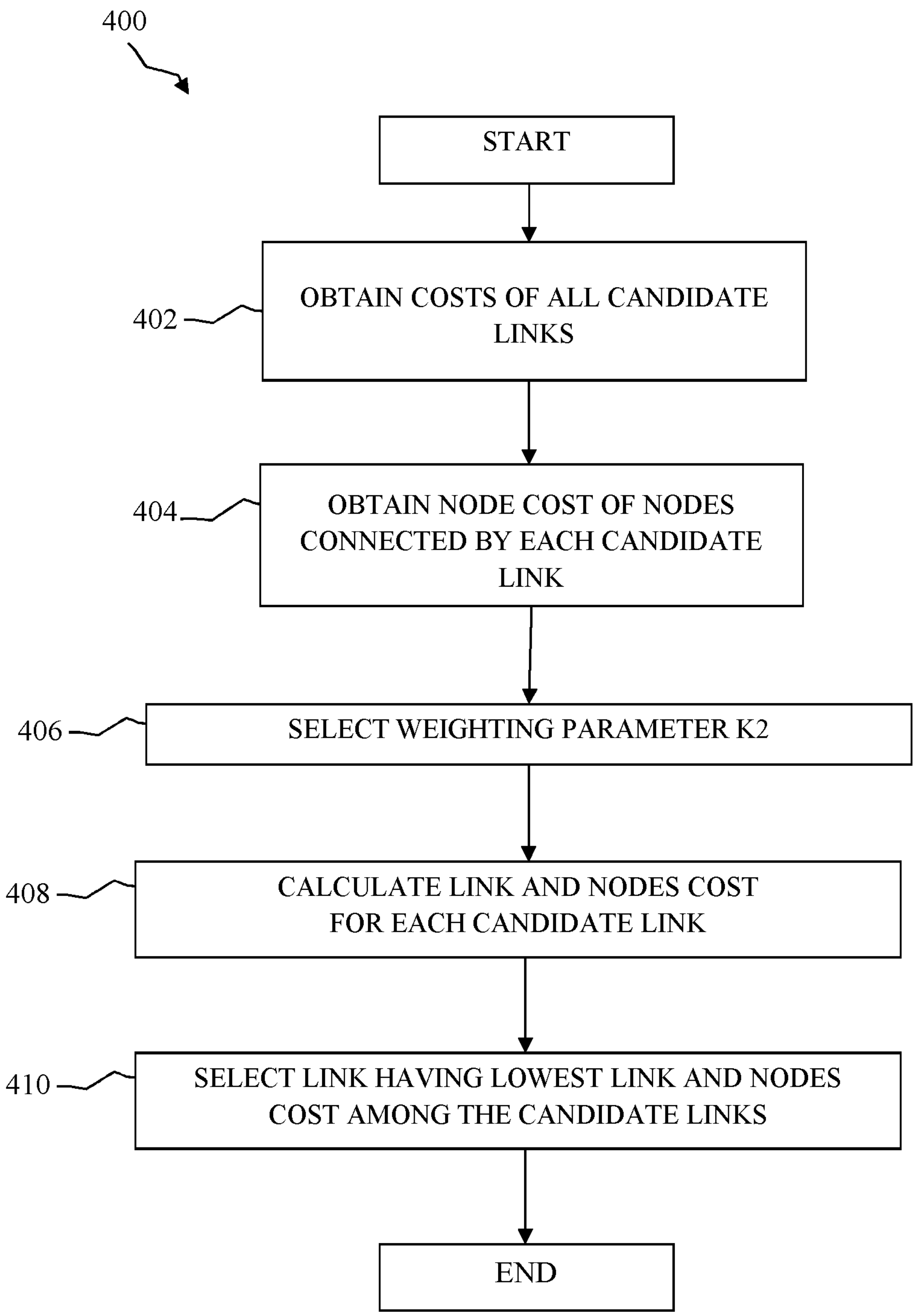
FIG. 4 is a flow chart of selecting links for constructing a subgraph according to an embodiment of the disclosure.

FIG. 4 illustrates a method 400 of selecting to-be-added links when constructing a subgraph of a network such as the network 100 in FIG. 1A. This method can also be used to select an initial link when a subgraph is to be grown by adding links to an initial link as described above. The operations in the method 400 may be performed in the order shown, or in a different order. Further, two or more the operations of the method 400 may be performed concurrently instead of sequentially. In some implementations, the method 400 may be employed using a distributed tree calculation where every node (e.g., n1, n2 . . . , and n30) selects the same links and computes the same subgraph of the network. In other implementations, the method 400 may be employed via one or more centralized controllers (e.g., an SDN controller) configured to select the links, compute the subgraph, and provision all relevant network information to every node in the network.

Figure 5:
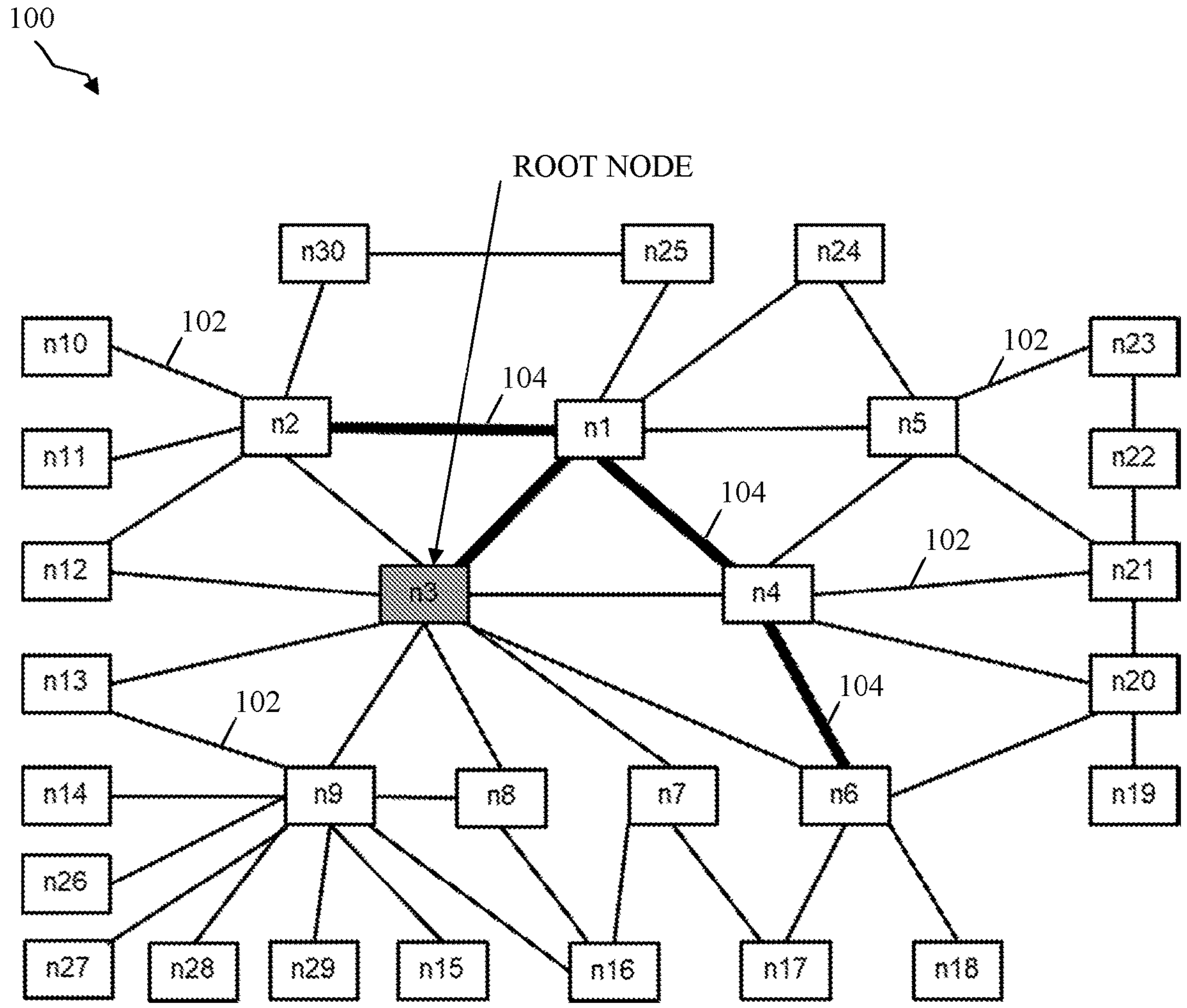
FIG. 5 depicts an initial stage of constructing a subgraph according to embodiments of the disclosure.

The method 400 may commence after a root node is selected or when selecting an initial link. A root node may be selected according to any of the techniques mentioned herein or according to other suitable techniques. For discussion purposes, assume that the method 200 of FIG. 2 selects the root node using an example in which k is set to 0.8 as an input to Equation 1. As shown in the chart 300, node n3 has the lowest Node Cost (3,594.64) when using k=0.8 as an input to Equation 1. Thus, the method 400 could proceed with using node n3 as the root node in this case, as shown in FIG. 5. This would complete the initial stage of constructing a subgraph for the network 100 if such tree construction is based on an initial root node selection.

In implementations where the method 400 commences when a subgraph is to be based on an initial link selected among a set of candidate links, the set of candidate links may be all links in the network 100. For example, the initial link may be selected by identifying a link having a lowest "Link and Nodes Cost," which can be calculated for all links as described below. After an initial link has been selected, that link and the nodes it connects are part of the subgraph, and then the set of candidate links may be all links that connect a node that is already part of the subgraph with a node that is not yet part of the subgraph. For discussion purposes, assume that the method 400 commences after selecting node n3 as the root node.

At block 402, the method 400 obtains costs of all candidate links. The candidate links to start growing a tree from a root node may be the links to which the root node may connect. For example, in FIG. 5, there are nine candidate links from which a link may be selected to connect the root node n3 to an available node (e.g., node n1, n2, n12, n13, n9, n8, n7, n6, or n4). The costs of these links may be denoted as LC1, LC2, . . . , LC9, where LC1 refers to the link cost between nodes n3 and n1; LC2 refers to the link cost between nodes n3 and n2; LC3 refers to the link cost between nodes n3 and n12; LC4 refers to the link cost between nodes n3 and n13; LC5 refers to the link cost between nodes n3 and n9; LC6 refers to the link cost between nodes n3 and n8; LC7 refers to the link cost between nodes n3 and n7; LC8 refers to the link cost between nodes n3 and n6; and LC9 refers to the link cost between nodes n3 and n4.

At block 404, the method 400 obtains a "Node Cost" for nodes connected to each of the candidate links (i.e., links n3-n1, n3-n2, n3-n12, n3-n13, n3-n9, n3-n8, n3-n7, n3-n6, and n3-n4). For a point-to-point connection between two nodes, a first Node Cost N1C may be calculated for the root node n3 and a second Node Cost N2C may be calculated for another node to which n3 may connect (e.g., node n1, n2, n12, n13, n9, n8, n7, n6, or n4). In this example, the method 400 calculates the Node Costs N1C and N2C using k=0.8 as an input to Equation 1. Thus, for the link between nodes n3 and n1, for example, N1C would be equal to 3,594.64 and N2C would be equal to 3,920.21. The method 400 repeats block 404 until a pair of node costs N1C and N2C are obtained for each of the candidate links.

At block 406, the method 400 selects a weighting parameter k2 for prioritizing Link Cost and/or Node Costs. Additional details regarding the selection of weighting parameter k2 are discussed below with respect to Table 2. At block 408, the method 400 calculates a "Link and Nodes Cost" for each of the candidate links. In an embodiment, the Link and Nodes Cost may be derived according to the following formula:

$$\text{Link and Nodes Cost} = \frac{1}{\frac{1}{N1C} + \frac{2*k2}{LC} + \frac{1}{N2C}}. \quad \text{(Equation 2)}$$

Assuming k2 is equal to 0.5 and k is equal to 0.8, the Link and Nodes Cost for each candidate link may be calculated using the values from Chart 300. For example, the link cost between nodes n3 and n1 is LC=200,000 because the link connecting these nodes is a high bandwidth link, while the Node Cost for root node n3 is NC1=3,594.64 and the Node Cost for node n1 is NC2=3,920.21. Using these values as inputs to Equation 2 yields the following output for the link between node n3 and n1: Link and Nodes Cost=1,857.77.

The link cost between the root node n3 and all other available nodes (n2, n12, n13, n9, n8, n7, n6, and n4) is LC=500,000 because these links are low bandwidth links. For the link between nodes n3 and n2, the Node Cost for root node n3 is NC1=3,594.64 and the Node Cost for node n2 is NC2=5,117.50; for the link between nodes n3 and n12, the Node Cost for root node n3 is NC1=3,594.64 and the Node Cost for node n12 is NC2=18,119.49; for the link between nodes n3 and n13, the Node Cost for root node n3 is NC1=3,3594.64 and the Node Cost for node n13 is NC2=18,119.49; for the link between nodes n3 and n9, the Node Cost for root node n3 is NC1=3,3594.64 and the Node Cost for node n9 is NC2=3,623.90; for the link between nodes n3 and n8, the Node Cost for root node n3 is NC1=3,3594.64 and the Node Cost for node n8 is NC2=12,079.66; for the link between nodes n3 and n7, the Node Cost for root node n3 is NC1=3,3594.64 and the Node Cost for node n7 is NC2=12,079.66; for the link between nodes n3 and n6, the Node Cost for root node n3 is NC1=3,594.64 and the Node Cost for node n6 is NC2=5,959.0; and for the link between nodes n3 and n4, the Node Cost for root node n3 is NC1=3,3594.64 and the Node Cost for node n4 is NC2=4,439.55.

Using the foregoing values as inputs to Equation 2 yields the following outputs: Link and Nodes Cost=2,102.61 for the link between node n3 and n2; Link and Nodes Cost=2,981.68 for the link between node n3 and n12; Link and Nodes Cost=2,981.68 for the link between node n3 and n13; Link and Nodes Cost=1,798.12 for the link between node n3 and n9; Link and Nodes Cost=2,755.0 for the link between node n3 and n8; Link and Nodes Cost=2,755.0 for the link between node n3 and n7; Link and Nodes Cost=2,232.12 for the link between node n3 and n6; and Link and Nodes Cost=1,978.47 for the link between node n3 and n4.

In some implementations, a particular link in the network 100 may be a multi-point link (also referred to as broadcast link or local area network (LAN) link) connecting n nodes, in which case Node Costs may be denoted N1C, N2C, N3C, . . . , NnC. In such implementations, the method 400 may combine all of the Node Costs and weigh the Link Cost LC for that particular link by a factor of n such that link costs and node costs are given equal weight. For example, to calculate the Link and Nodes Cost associated with a multipoint link connecting more than two nodes, Equation 2 may be generalized as follows:

$$\text{Link and Nodes Cost} = \frac{1}{\frac{n*k2}{LC} + \sum_{i=1}^{n} \frac{1}{NiC}}. \quad \text{(Equation 3)}$$

In Equation 3, n denotes the number of links to which the multi-point link connects, k2 denotes the weighting parameter described in Table 2, LC denotes the Link Cost of the multi-point link, and NiC denotes the Node Cost of the $i^{th}$ node to which the multi-point link connects.

Note that the above equation assumes that the link cost (LC) and nodes costs (N1C, N2C, . . . , NnC) are greater than zero. If the type of costs being used permits a value of zero or a negative cost value, a constant may be added to assure positive costs. As an example, if a non-negative integer cost such as zero were to occur, that cost may be incremented by 1 before using Equation 2 to calculate the Link and Nodes Cost.

In some implementations, when considering which link to select among a set of candidate links, a node that is already part of the subgraph may be viewed as a fixed node. That is, there may be only one node available linking to new nodes that are not yet part of the subgraph, such as when first adding links to the root node. If so, the method 400 may only compute the Node Cost of the node (or nodes in the case of a multi-point link) to be added. As such, the method 400 may calculate the Link and Nodes Cost for a point-to-point link according to the following formula:

$$\text{Link and Nodes Cost} = \frac{1}{\frac{k2}{LC} + \frac{1}{N2C}}. \quad \text{(Equation 4)}$$

In general, if there are j fixed nodes connected by all candidate links among which a selection is being made, the generalized formula corresponding to Equation 3 may be modified by (1) summing over only the n–j (i.e., n minus j) other nodes connected to each candidate link; and (2) changing the weighting of the reciprocal of Link Cost LC from n to n–j.

Table 2 below includes a mapping between values of k2 and the effects of selecting different values of k2 as inputs for Equations 2 and 3.

TABLE 2

| Value of k | Effect |
|---|---|
| k2 = 0 | The Link and Nodes Cost depends only on the node costs, i.e., link cost (LC) is ignored. |
| 0 < k2 < 1 | Cost is based on the link costs and cost of nodes to be connected but, as k2 decreases, the nodes cost is given greater weight and the link cost less weight. |
| k2 = 1 | The link cost and the cost of the nodes are given equal weight. |
| 1 < k2 | Cost is based on the link costs and cost of nodes to be connected but, as k2 increases, the nodes cost is given less weight and the link cost greater weight. |

As can be seen from Table 2, setting k2 to a value between 0 and 1 prioritizes node costs over link cost as the value of k2 reaches closer to 0. This may be appropriate where some processing is being done at the nodes and the volume of data is somewhat limited (e.g., the forwarding of link state information for IS-IS or OSPF applications). On the other hand, setting k2 to a value greater than 1 prioritizes link cost over nodes cost. Thus, such values may be appropriate for applications where nodes simply forward broadcast or multicast user traffic (e.g., when link capability is be of higher priority). However, it should be noted that setting k2 to relatively larger values than 1 has an effect similar to that of selecting a link having the lowest low cost among the candidate links.

At block 410, the method 400 selects the link having the lowest Link and Nodes Cost from the candidate links. Using the example above where k is set to 0.8 and k2 is set to 0.5 as an input to Equation 2, the link having the lowest Link and Nodes Cost corresponds to that between root node n3 and node n9 (i.e., Link and Nodes Cost=1,798.12). Thus, the method 400 adds this link to connect root node to node n9, which is the first node added to the subgraph in the subgraph construction process. Note that the method 400 would select the same link when using the Link and Nodes Cost according to Equation 3 rather than Equation 2. For example, using k2=0.5, LC=500,000, and N2C=3,623.9 (node n9) as inputs to Equation 3 yields a Link and Nodes Cost output of 3,610.8, which is the lowest cost. The next lowest cost corresponds to the link between nodes n3 and n1. For example, using k2=0.5, LC=200,000, and N2C=3,920.21 (node n1) as inputs to Equation 3 yields a Link and Nodes Cost output of 3,882.16.

After adding a link connecting root node n3 to node 9, the method 400 may add additional links connecting either the root node n3 to other nodes (e.g., n1, n2, n12, n13, n8, n7, n6, and/or n4) or node n9 to other nodes (e.g., n13, n14, n26, n27, n28, n29, n15, n16, and/or n8). For example, the method 400 may add a link connecting root node n3 to node n1 because that link has the second lowest Link and Nodes Cost of the remaining links originating at n3. Alternatively, the method 400 may be used to calculate the Link and Nodes cost for the remaining links from node n3 and the additional links from node n9, other than the link to node n3, which is already part of the subgraph being constructed.

In other words, the method 400 may calculate the Link and Nodes cost for all links root between node n3 and nodes n1, n2, n12, n13, n8, n7, n6, and n4, as well as the Link and Nodes cost for all links between node n9 and nodes n13, n14, n26, n27, n28, n29, n15, n16, and n8. The method 400 may then choose the link with the lowest Links and Nodes cost from this larger set to connect node n3 or node n9 to another node. The method 400 may continue adding links in a similar manner to connect nodes that are already part of the network 100 to nodes that are not yet part of the network 100 until links have been added connecting all nodes n1-n30 in the network 100.

Note that some links have identical Link and Nodes Cost such as for the link between nodes n3 and n12 and the link between nodes n3 and n13. In this case, the method 400 may implement a tiebreaking procedure to determine which link to select. For example, the method 400 may select the link between nodes n3 and n13 because node n13 is a higher numbered than node n12. Alternatively, the method 400 may select the link between nodes n3 and n12 because n12 is a lowered numbered node than n13.

Moreover, assume an example in which links have been added connecting the root node n3 to nodes n9 and n8. In this example, the method 400 may refrain from adding a link between nodes n9 and n8 to avoid formation of a cycle (i.e., between nodes n3, n9, and n8) in the network 100.

In some embodiments, the method 400 may select links in block 410 simply based on Link Cost. That is, rather than selecting a link having the lowest Link and Nodes Cost, the method 400 may select the link having the lowest Link Cost.

In such embodiments, the method 400 may add a link connecting root node n3 to node n1 as the first link to be added in block 410, as this link has the lowest costs (LC=200,000) among the candidate links. If two or more links have the same Link Cost, the method 400 may implement a tiebreaking procedure as disclosed herein.

In some embodiments, the method 400 may select links in block 410 based on bandwidth. For example, every link in the network 100 may have a link bandwidth and every node in the network 100 may have a node bandwidth. In this case, a Link and Nodes Bandwidth for a particular point-to-point link in the network 100 may be derived as follows:

$$\text{Link and Nodes Bandwidth} = 2*k2*LB + N1B + N2B. \qquad \text{(Equation 5)}$$

In Equation 5, LB refers to the link bandwidth of a particular link between two nodes, N1B and N2B refer to the bandwidths of these two nodes, and k2 refers to a non-negative value as described in Table 2 above. After calculating the Link and Nodes Bandwidth for each candidate link, the method 400 selects the link having the largest Link and Nodes Bandwidth according to Equation 5.

If the network 100 comprises one or more multi-point links connecting n nodes having node bandwidths N1B, N2B, . . . , NnB, a Link and Nodes Bandwidth for a particular multi-point link in the network 100 may be derived as follows:

$$\text{Link and Nodes Bandwidth} = n*k2*LB + \sum_{i=1}^{n} NiB. \qquad \text{(Equation 6)}$$

In Equation 6, LB refers to link bandwidth of the particular multi-point link, n refers to the number of nodes to which the multi-point link is connected, k2 refers to a non-negative value as described in Table 2 above, and NiB refers to the node bandwidth of the $i^{th}$ node. After calculating the Link and Nodes Bandwidth for each candidate link, the method 400 selects the link having the largest Link and Nodes Bandwidth according to Equation 6.

In some cases, a particular node may be a fixed node shared by multiple point-to-point candidate links such that the fixed node appears at one of each candidate link. In such cases, when selecting links based on Link and Nodes Bandwidth, the method 400 may only take into account the node bandwidth of the node that differs between the point-to-point links (i.e., the bandwidth of the to be added, but not the bandwidth of the fixed node). For example, the Link and Nodes Bandwidth may be derived as follows:

$$\text{Link and Nodes Bandwidth} = k2*LB + N2B. \qquad \text{(Equation 7)}$$

In Equation 7, LB refers to link bandwidth of a particular link, N2B refers to bandwidth of the non-fixed node, and k2 refers to a non-negative value as described in Table 2 above. After calculating the Link and Nodes Bandwidth for each candidate link, the method 400 selects the link having the largest Link and Nodes Bandwidth according to Equation 7.

The method 400 may perform a similar selection when dealing with multi-point links. For example, assuming that j of the nodes connected by the candidate links among which the selection is being made are the same, the Link and Nodes Bandwidth can be calculated for a link from LB and the Node Cost other n−j nodes on the link as (n−j)*k2*LB plus the bandwidths of the other nodes on the link.

In implementations where bandwidth may not be directly known or acquired, but the links are known to have costs C1, C2, C3, . . . , the bandwidth may be estimated based on link costs as follows: Node Bandwidth=1/C1+1/C2+1/C3+ . . . .

In some implementations, link costs can be asymmetric, where the cost from node one N1 to node two N2 is different from the cost from node two N2 to node N1. In such implementations, the link cost used in the root selection method disclosed herein may be derived from the two different directional costs by computing the arithmetic, geometric, or harmonic mean of those cost or by selecting one in a systematic manner, such as selecting the highest or lowest of the two costs, or by any combination of these methods.

In some embodiments, the disclosed techniques may be employed to construct multiple distribution trees and/or flooding graphs for a particular network. That is, the disclosure is not limited to selecting links for a single tree/graph, as a network may comprise multiple trees/graphs at the same time, e.g., multiple trees/graphs may be in simultaneous use in a network. Therefore, the disclosed techniques may be employed to construct multiple trees/graphs, such that each tree/graph is tailored for certain applications (e.g., different types of traffic). For example, when a network is used for high bandwidth data transmissions, links and/or nodes may be selected to construct a tree/graph having low-cost links. As another example, when the network is used for transmitting control data with limited amounts of traffic, nodes and/or links may be selected to construct another tree/graph having many links (i.e., with less emphasis on link costs) to quickly distribute such control data.

Figure 6:
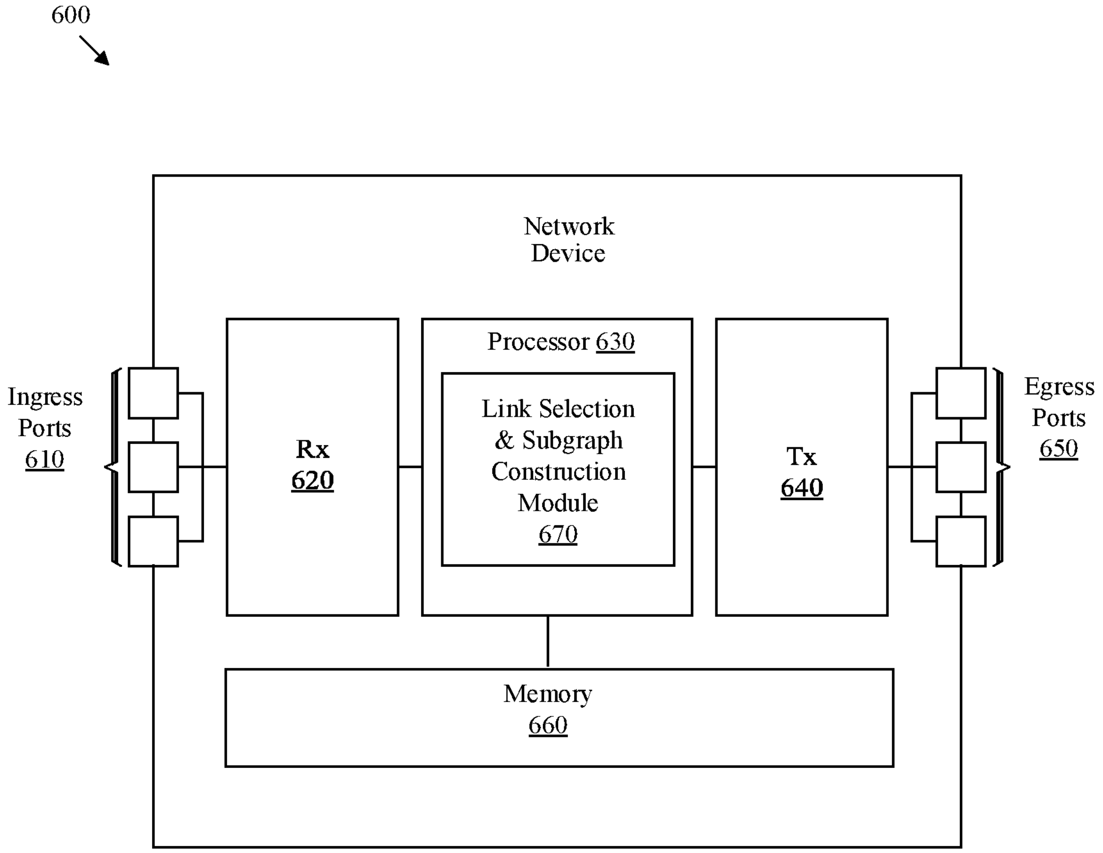
FIG. 6 is a schematic diagram of a network device according to an embodiment of the disclosure.

FIG. 6 is a schematic diagram of a network device 600 according to an embodiment of the disclosure. The network device 600 is suitable for implementing the components described herein. The network device 600 comprises ingress ports 610 and receiver units (Rx) 620 for receiving data; a processor, logic unit, or central processing unit (CPU) 630 to process the data; transmitter units (Tx) 640 and egress ports 650 for transmitting the data; and a memory 660 for storing the data. The network device 600 may also comprise optical-to-electrical (OE) components and electrical-to-optical (EO) components coupled to the ingress ports 610, the receiver units 620, the transmitter units 640, and the egress ports 650 for egress or ingress of optical or electrical signals.

In some embodiments, the network device 600 may connect to one or more bidirectional links. Additionally, the receiver units 620 and transmitter units 640 may be replaced with one or more transceiver units at each side of the network device 600. Similarly, the ingress ports 610 and egress ports 650 may be replaced with one or more combinations of ingress/egress ports at each side of the network device 600. As such, the transceiver units 620 and 640 may be configured to transmit and receive data over one or more bidirectional links via ports 610 and 650.

The processor 630 may be implemented by hardware and software. The processor 630 may be implemented as one or more CPU chips, cores (e.g., as a multi-core processor), field-programmable gate arrays (FPGAs), application specific integrated circuits (ASICs), and digital signal processors (DSPs). The processor 630 may be in communication with the ingress ports 610, receiver units 620, transmitter units 640, egress ports 650, and memory 660. The processor 630 comprises a link selection and subgraph construction module 670. The module 670 may implement the disclosed embodiments described above. For instance, the module 670 may implement the method 200 of FIG. 2, the method 400 of FIG. 4, and processes discloses herein. The inclusion of the module 670 therefore provides a substantial improvement to the functionality of the device 600 and effects a transformation of the device 600 to a different state. Alternatively, the module 670 may be implemented as instructions stored in the memory 660 and executed by the processor 630.

The memory 660 comprises one or more disks, tape drives, and solid-state drives and may be used as an overflow data storage device, to store programs when such programs are selected for execution, and to store instructions and data that are read during program execution. The memory 660 may be volatile and non-volatile and may be read-only memory (ROM), random-access memory (RAM), ternary content-addressable memory (TCAM), and static random-access memory (SRAM).

Figure 7:
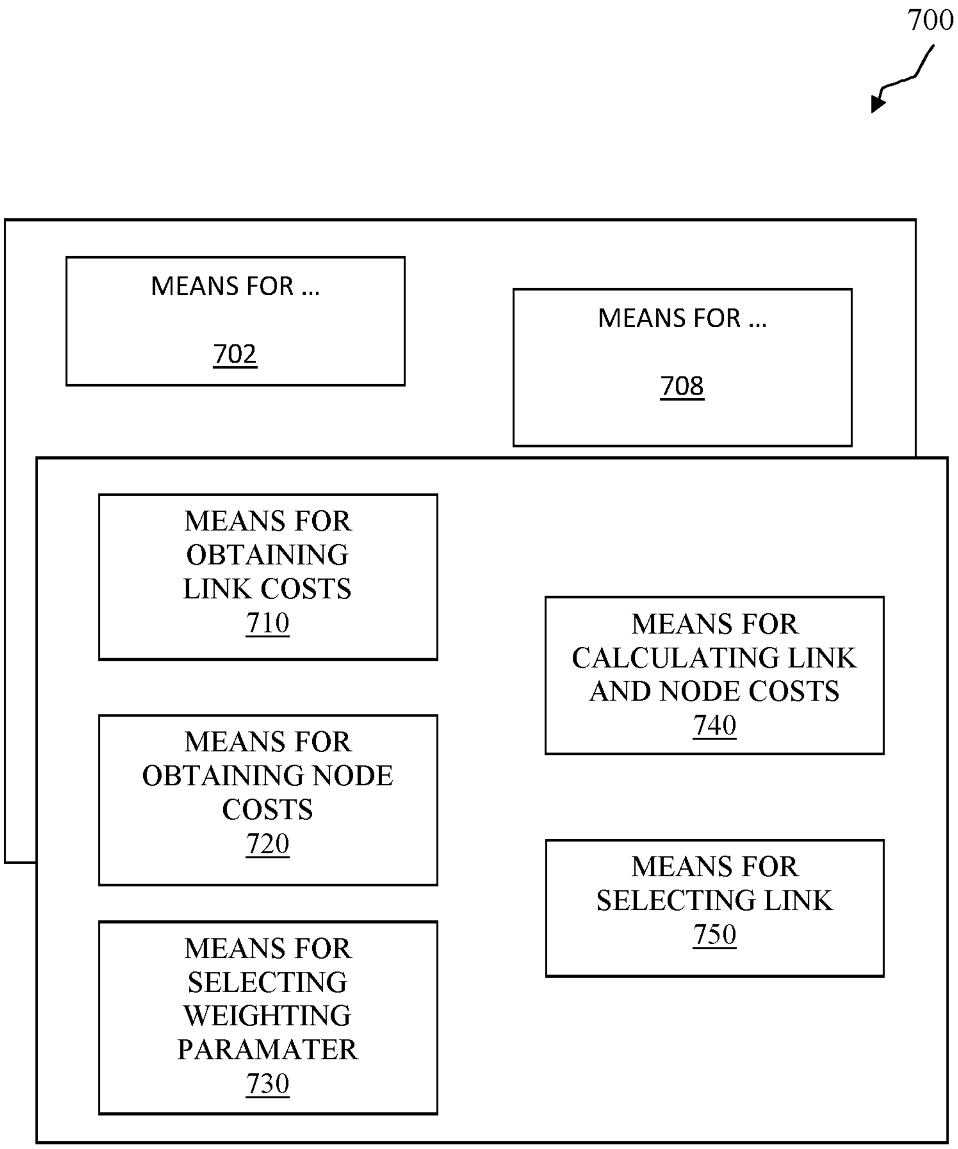
FIG. 7 is a schematic diagram of an apparatus for implementing link selection and subgraph construction methods according to embodiments of the disclosure.

FIG. 7 is a schematic diagram of an apparatus 700 for selecting links of a network subgraph according to various embodiments of the disclosure. The apparatus 700 comprises: means 710 for obtaining link costs of links in a network; means 720 for obtaining node costs of nodes connected by each of the links in the network, wherein the node costs comprise a first node cost of a first node and a second node cost of a second node selected from the nodes; means 730 for selecting a weighting parameter based on the link costs, the node costs, or both; means 740 for calculating link and node costs for each of the links, wherein the link and node costs are calculated based on the link costs, the node costs, the weighting parameter, or any combination thereof; and means 750 for selecting a link having a lowest link and node cost among the links.

Figure 8:
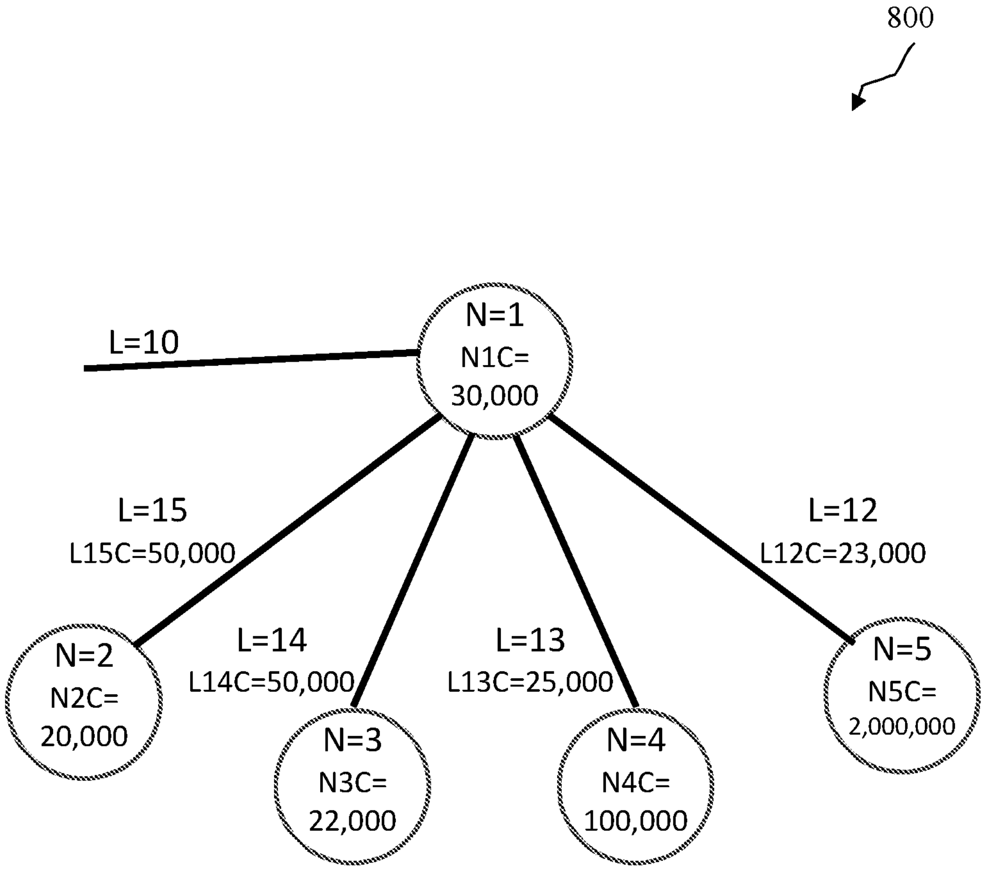
FIG. 8 is a schematic diagram of a partial network subgraph according to embodiments of the disclosure.

Referring now to FIG. 8, an example of expanding a partial network subgraph 800 will be described according to embodiments of the disclosure. In FIG. 8, assume that the method 400 is employed to connect Link 10 (L=10) to the network subgraph 800 by adding a link (e.g., Link 12, Link 13, Link 14, or Link 15) connected to Node 1 (N=1) based on calculating Link and Nodes Cost as described above. Table 3 below depicts an example of the Link and Nodes Cost calculated for each candidate link using different values of k2 as inputs to Equation 2.

TABLE 3

| Link and Nodes Cost | | | | | | | |
|---|---|---|---|---|---|---|---|
| Link | Link Cost | N1 Cost | Other Node | Other Node Cost | k2 = 0.5 | k2 = 1.0 | k2 = 2.0 |
| L = 12 | 23,000 | 30,000 | N = 5 | 1,000,000 | 12,934.67 | 8,278.84 | 4,813.56 |
| L = 13 | 25,000 | 30,000 | N = 4 | 100,000 | 12,000.00 | 8,108.11 | 4,918.03 |
| L = 14 | 50,000 | 30,000 | N = 3 | 22,000 | 10,122.70 | 8,418.37 | 6,297.71 |
| L = 15 | 50,000 | 30,000 | N = 2 | 20,000 | 9,677.42 | 8,108.11 | 5,122.45 |

As shown via bolded text in Table 3, Link 15 has the lowest Link and Nodes Cost when using k2=0.5, and thus, the method 400 adds Link 15 to connect Node 1 to Node 2, which has the lowest node cost (20,000) among the other nodes. This is consistent with Table 2, which indicates that Equation 2 prioritizes node cost over link cost when k2 is between 0 and 1. On the other hand, Link 12 has the lowest Link and Nodes Cost when using k2=2.0, and thus, the method 400 connects Node 1 to Node 5 by adding Link 12, which has the lowest link cost (23,000) among the candidate links. This is also consistent with Table 2, as Equation 2 prioritizes link cost over node cost when k2 is greater than 1. Further, Link 15 and link 13 tie for the lowest Link and Nodes Cost when using k2=1.0, and thus a tie breaker is needed to determine the link to connect Node 1 to Node 2.

Note that in the example above, different Link and Nodes Cost values were calculated for each of the candidate links and nodes. However, when the Link and Nodes Cost value is the same for two different links (as is the case between Links 13 and 15 with k2=1.0), the method 400 would implement a tiebreaking procedure to select between the two links, e.g., based on lowest cost link, an identifier such as a serial number or port address, etc.

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of selecting links for a network subgraph, the method comprising:

obtaining at least two link costs of at least two links selected from a plurality of links in a network;

obtaining at least two node costs of at least two nodes connected by links of the plurality of links in the network;

selecting a weighting parameter based on the at least two link costs, the at least two node costs, or both;

calculating link costs and node costs based on any combination of the at least two link costs, the at least two node costs, and the selected weighting parameter;

selecting a link having a lowest link and node cost among the plurality of links, wherein selecting the link is performed without computing any global metric over the entire network, network subgraph, or path;

storing the selected link on a node of the network; and transmitting data by the node using the selected link, and wherein either:

calculating a link and node cost for a candidate link selected from a link of the plurality of links in the network is based on a following equation:

$$\text{Link and Nodes Cost} = \frac{1}{\frac{1}{N1C} + \frac{2*k2}{LC} + \frac{1}{N2C}},$$

wherein N1C denotes a first node cost of a first node in the at least two nodes, wherein N2C denotes a second node cost of a second node in the at least two nodes, wherein LC denotes a link cost of the candidate link, and wherein k2 denotes the weighting parameter, or wherein at least one link of the plurality of links in the network is a multi-point link that connects more than two nodes, and wherein calculating a link and node cost for the multi-point link is based on following equation:

$$\text{Link and Nodes Cost} = \frac{1}{\frac{n*k2}{LC} + \sum_{i=1}^{n} \frac{1}{NiC}},$$

wherein n denotes a quantity of nodes to which the multi-point link connects, wherein LC denotes a link cost of the multi-point link, wherein k2 denotes the weighting parameter, and wherein NiC denotes a node cost of an $i^{th}$ node.

2. The method of claim 1, wherein the links in the network are those connecting a node forming part of the network subgraph to one or more nodes not yet part of the network subgraph.

3. The method of claim 1, wherein, when at least one link of the plurality of links in the network is a multi-point link that connects more than two nodes, selecting the weighting parameter comprises setting the weighting parameter to a value greater than 1.

4. The method of claim 1, wherein, when at least one link of the plurality of links in the network is a multi-point link that connects more than two nodes, selecting the weighting parameter comprises setting the weighting parameter to a value between 0 and 1.

5. A network device for selecting links of a network subgraph, comprising:

a storage device; and a processor coupled to the storage device and configured to execute instructions on the storage device such that when executed, cause the network device to:

obtain at least two link costs of at least two links selected from a plurality of links in a network;

obtain at least two node costs of at least two nodes connected by links of the plurality of links in the network;

select a weighting parameter based on the at least two link costs, the at least two node costs, or both;

calculate link costs and node costs based on any combination of the at least two link costs, the at least two node costs, and the weighting parameter;

select a link having a lowest link and node cost among the plurality of links, wherein selecting the link is performed without computing any global metric over the entire network, network subgraph, or path;

store the selected link on a node of the network; and transmit data by the node using the selected link, and wherein either:

calculating a link and node cost for a candidate link selected from a link of the plurality of links in the network is based on a following equation:

$$\text{Link and Nodes Cost} = \frac{1}{\frac{1}{N1C} + \frac{2*k2}{LC} + \frac{1}{N2C}},$$

wherein N1C denotes a first node cost of a first node in the at least two nodes, wherein N2C denotes a second node cost of a second node in the at least two nodes, wherein LC denotes a link cost of the candidate link, and wherein k2 denotes the weighting parameter, or wherein at least one link of the plurality of links in the network is a multi-point link that connects more than two nodes, and wherein calculating a link and node cost for the multi-point link is based on following equation:

$$\text{Link and Nodes Cost} = \frac{1}{\frac{n*k2}{LC} + \sum_{i=1}^{n} \frac{1}{NiC}},$$

wherein n denotes a quantity of nodes to which the multi-point link connects, wherein LC denotes a link cost of the multi-point link, wherein k2 denotes the weighting parameter, and wherein NiC denotes a node cost of an $i^{th}$ node.

6. The network device of claim 5, wherein the links in the network are those connecting a node forming part of the network subgraph to one or more nodes not yet part of the network subgraph.

7. The network device of claim 5, wherein, when at least one link of the plurality of links in the network is a multi-point link that connects more than two nodes, the network device selects the weighting parameter by setting the weighting parameter to a value greater than 1.

8. The network device of claim 5, wherein, when at least one link of the plurality of links in the network is a multi-point link that connects more than two nodes, the network device selects the weighting parameter by setting the weighting parameter to a value between 0 and 1.

9. A non-transitory computer readable medium configured to store instructions that, when executed by a processor of a network device, cause the network device to perform a method for selecting links of a network subgraph, the method comprising:

obtaining at least two link costs of at least two links selected from a plurality of links in a network;

obtaining at least two node costs of at least two nodes connected by links of the plurality of links in the network;

selecting a weighting parameter based on the at least two link costs, the at least two node costs, or both;

calculating link and node costs based on any combination of the at least two links, the at least two node costs, and the weighting parameter; and selecting a link having a lowest link and node cost among the plurality of links, wherein selecting the link is performed without computing any global metric over the entire network, network subgraph, or path;

storing the selected link on a node of the network; and transmitting data by the node using the selected link, and wherein either:

calculating a link and node cost for a candidate link selected from a link of the plurality of links in the network is based on a following equation:

$$\text{Link and Nodes Cost} = \frac{1}{\frac{1}{N1C} + \frac{2*k2}{LC} + \frac{1}{N2C}},$$

wherein N1C denotes a first node cost of a first node in the at least two nodes, wherein N2C denotes a second node cost of a second node in the at least two nodes, wherein LC denotes a link cost of the candidate link, and wherein k2 denotes the weighting parameter, or wherein at least one link of the plurality of links in the network is a multi-point link that connects more than two nodes, and wherein calculating a link and node cost for the multi-point link is based on following equation:

$$\text{Link and Nodes Cost} = \frac{1}{\frac{n*k2}{LC} + \sum_{i=1}^{n} \frac{1}{NiC}},$$

wherein n denotes a quantity of nodes to which the multi-point link connects, wherein LC denotes a link cost of the multi-point link, wherein k2 denotes the weighting parameter, and wherein NiC denotes a node cost of an $i^{th}$ node.

10. The non-transitory computer readable medium of claim 9, wherein the links in the network are those connecting a node forming part of the network subgraph to one or more nodes not yet part of the network subgraph.

11. The non-transitory computer readable medium of claim 9, wherein, when at least one link of the plurality of links in the network is a multi-point link that connects more than two nodes, further causing the network device to select the weighting parameter comprises setting the weighting parameter to a value greater than 1.

12. The non-transitory computer readable medium of claim 9, wherein, when at least one link of the plurality of links in the network is a multi-point link that connects more than two nodes, further causing the network device to select the weighting parameter comprises setting the weighting parameter to a value between 0 and 1.

* * * * *